United States Patent
Kita

(10) Patent No.: US 9,253,366 B2
(45) Date of Patent: Feb. 2, 2016

(54) IMAGE FORMING APPARATUS AND IMAGE READING DEVICE

(71) Applicant: FUJI XEROX CO., LTD., Tokyo (JP)

(72) Inventor: Hiromi Kita, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/514,941

(22) Filed: Oct. 15, 2014

(65) Prior Publication Data
US 2015/0281514 A1    Oct. 1, 2015

(30) Foreign Application Priority Data

Mar. 26, 2014 (JP) .................. 2014-064476
Mar. 26, 2014 (JP) .................. 2014-064477

(51) Int. Cl.
| | | |
|---|---|---|
| H04N 1/38 | (2006.01) | |
| H04N 1/387 | (2006.01) | |
| H04N 1/00 | (2006.01) | |
| H04N 1/053 | (2006.01) | |

(52) U.S. Cl.
CPC ........... *H04N 1/3878* (2013.01); *H04N 1/0062* (2013.01); *H04N 1/00572* (2013.01); *H04N 1/00588* (2013.01); *H04N 1/053* (2013.01); *H04N 2201/0082* (2013.01)

(58) Field of Classification Search
CPC ............... B65H 2801/39; B65H 9/004; B65H 2301/51232; H04N 2201/0081; H04N 2201/0091; H04N 1/00588; H04N 1/12; H04N 1/193; H04N 1/00278; H04N 1/00602; H04N 1/00037; H04N 1/00578; H04N 1/00968

USPC ......... 358/498, 448, 474, 461, 484, 496, 497, 358/449, 488; 271/109, 265.01, 3.16, 271/10.02, 11, 110, 125, 225, 226, 228; 382/112

See application file for complete search history.

(56) References Cited

U.S. PATENT DOCUMENTS

| | | | | |
|---|---|---|---|---|
| 5,534,973 | A * | 7/1996 | Harada | 399/1 |
| 5,601,281 | A * | 2/1997 | Kubodera et al. | 271/10.04 |
| 6,901,237 | B2 * | 5/2005 | Nakamura | 399/367 |
| 7,860,446 | B2 * | 12/2010 | Nakamura | 399/372 |
| 8,665,502 | B2 * | 3/2014 | Masaki et al. | 358/488 |
| 9,001,391 | B2 * | 4/2015 | Masaki et al. | 358/474 |
| 2005/0219652 | A1 * | 10/2005 | Park | 358/488 |
| 2006/0291013 | A1 * | 12/2006 | Shimizu | 358/498 |
| 2010/0141991 | A1 * | 6/2010 | Yoshida et al. | 358/1.15 |
| 2010/0225983 | A1 * | 9/2010 | Fujii et al. | 358/498 |
| 2011/0075168 | A1 * | 3/2011 | Ikari | 358/1.9 |
| 2012/0013955 | A1 * | 1/2012 | Ikeda | 358/461 |
| 2012/0120456 | A1 * | 5/2012 | Shiho | 358/448 |
| 2013/0182296 | A1 * | 7/2013 | Masaki et al. | 358/488 |

FOREIGN PATENT DOCUMENTS

| | | |
|---|---|---|
| JP | A-2012-244383 | 12/2012 |
| JP | A-2013-146034 | 7/2013 |

* cited by examiner

*Primary Examiner* — Negussie Worku
(74) *Attorney, Agent, or Firm* — Oliff PLC

(57) ABSTRACT

There is provided an image forming apparatus. A loading unit is capable of loading therein a plurality of documents. The document is conveyed from the loading unit to a document conveyance path. A reading member is configured to read an image of the document at a reading position set on the document conveyance path. A correction unit corrects a skew of the document with respect to a conveying direction. A correction execution unit executes a correction by the correction unit when a number of copies of the document is larger than a preset number.

21 Claims, 30 Drawing Sheets

(CONT.)

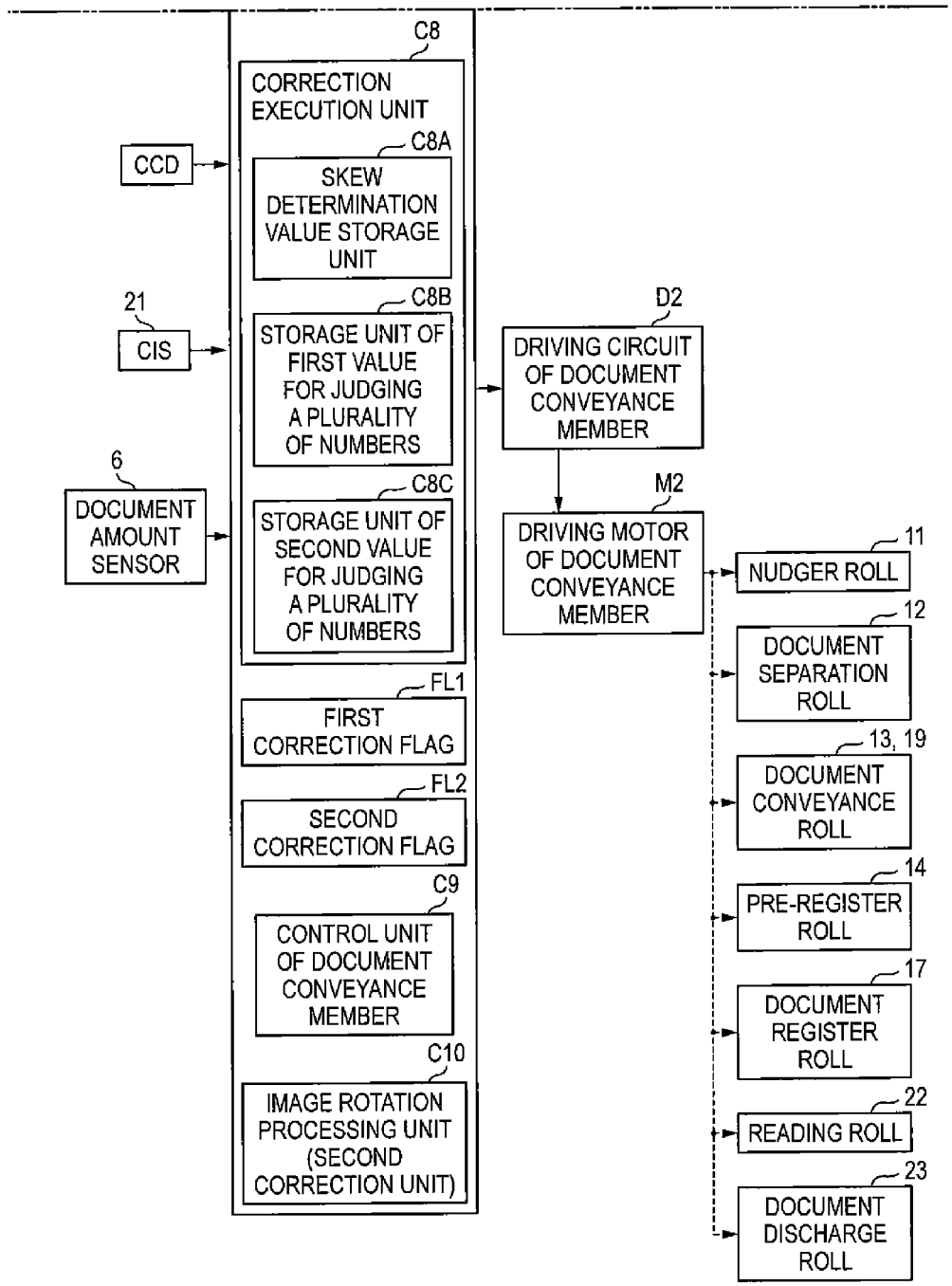

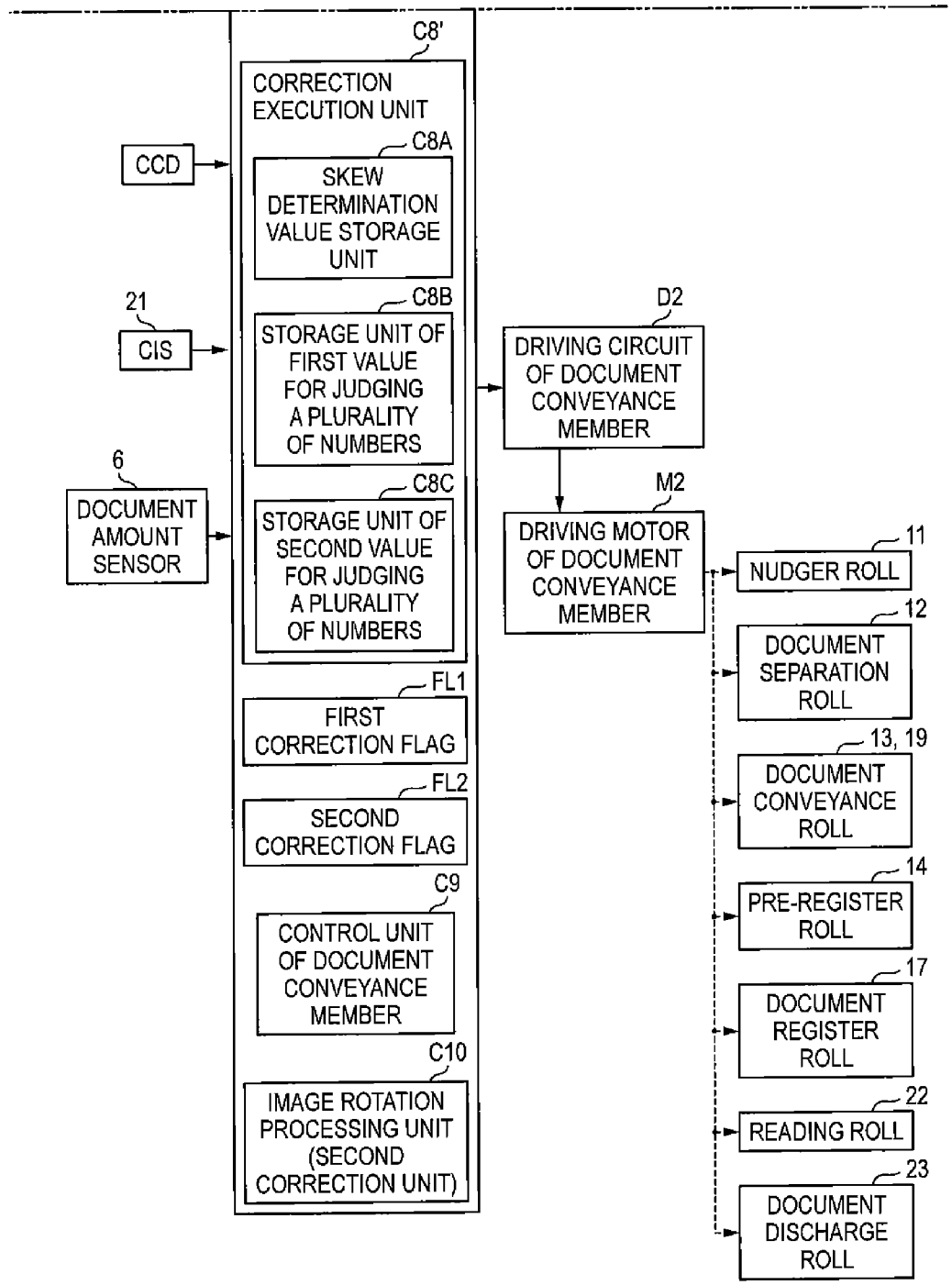

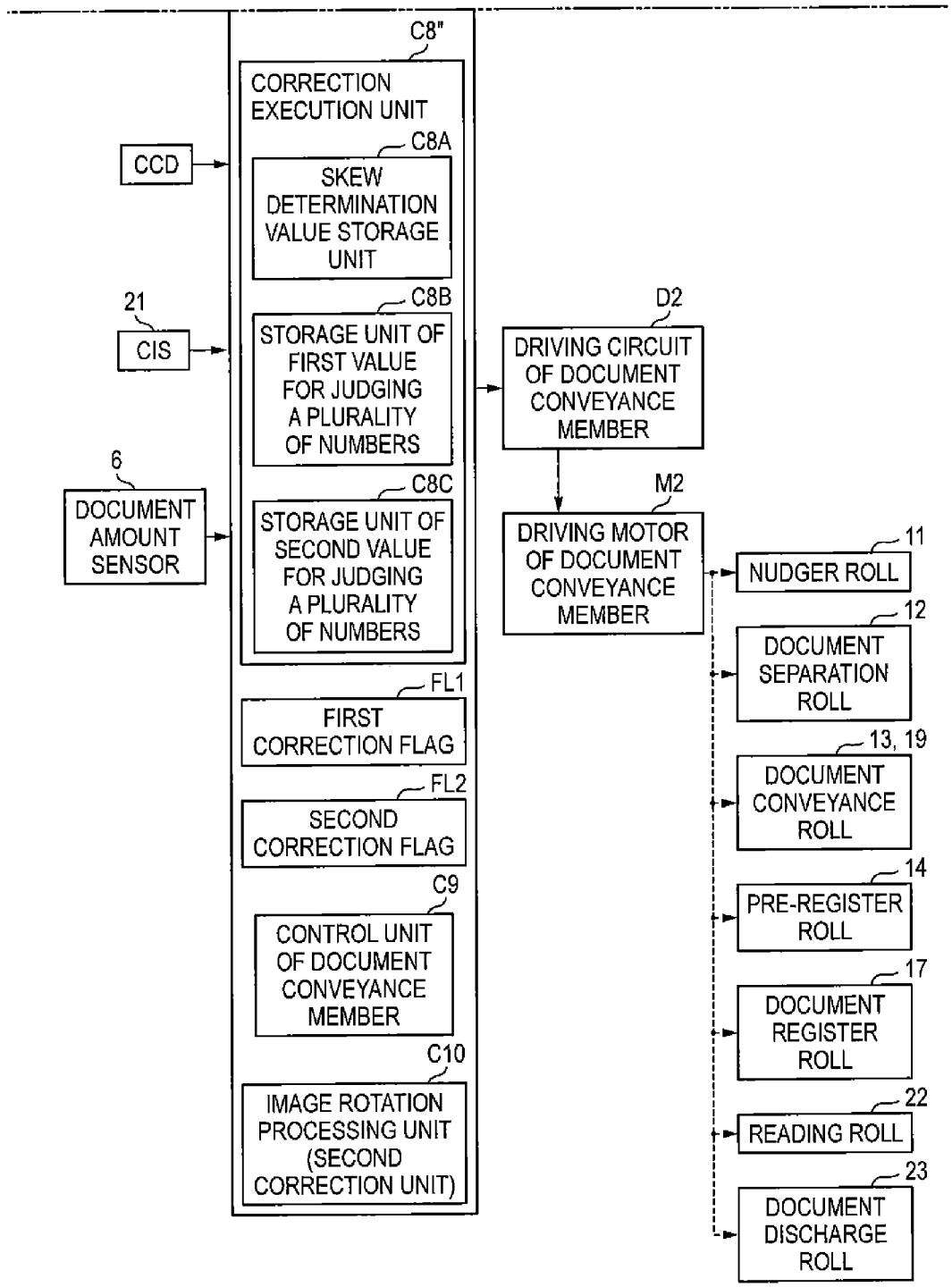

(CONT.)

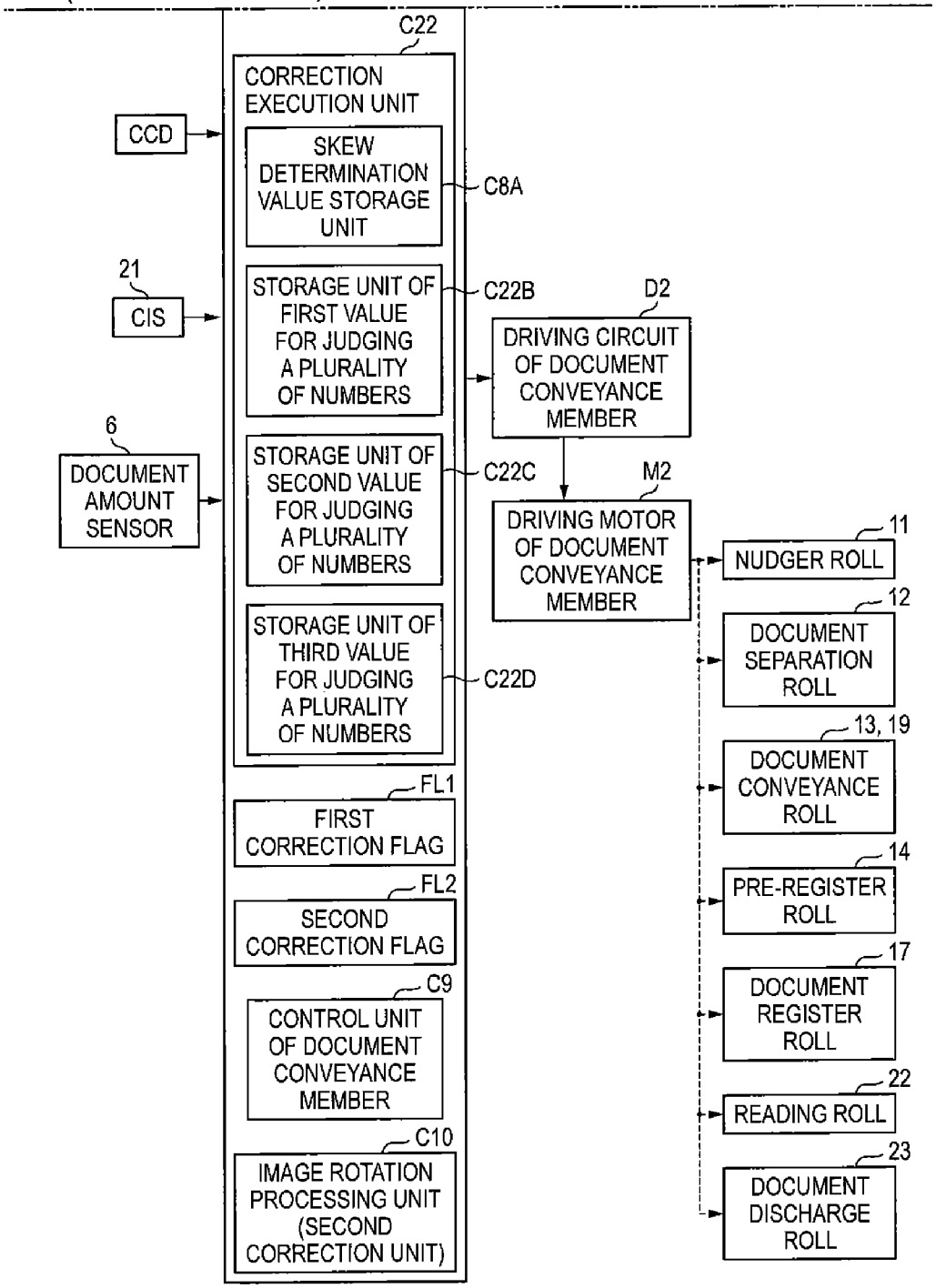

(CONT.)

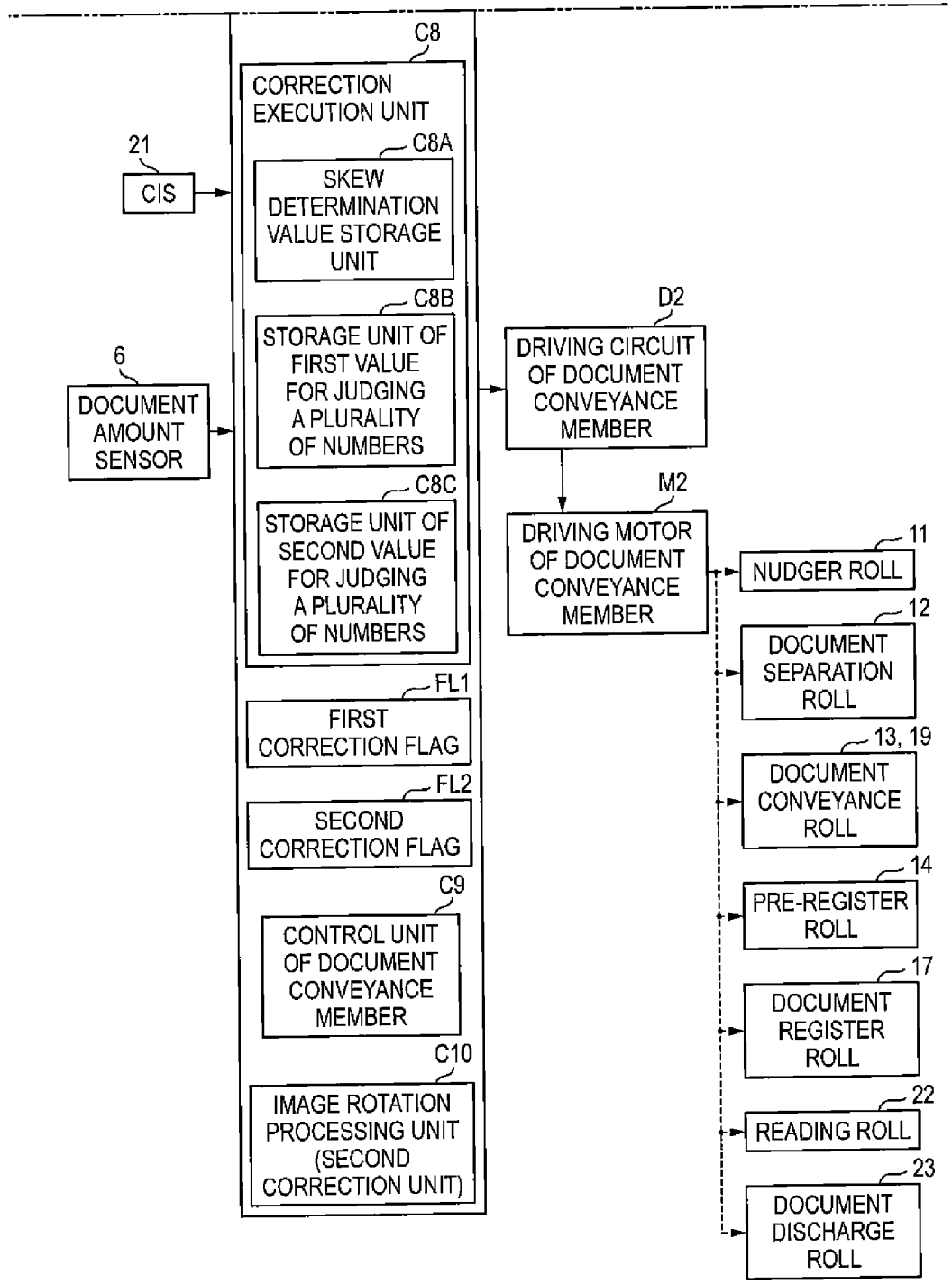
(FIG. 12 CONTINUED)

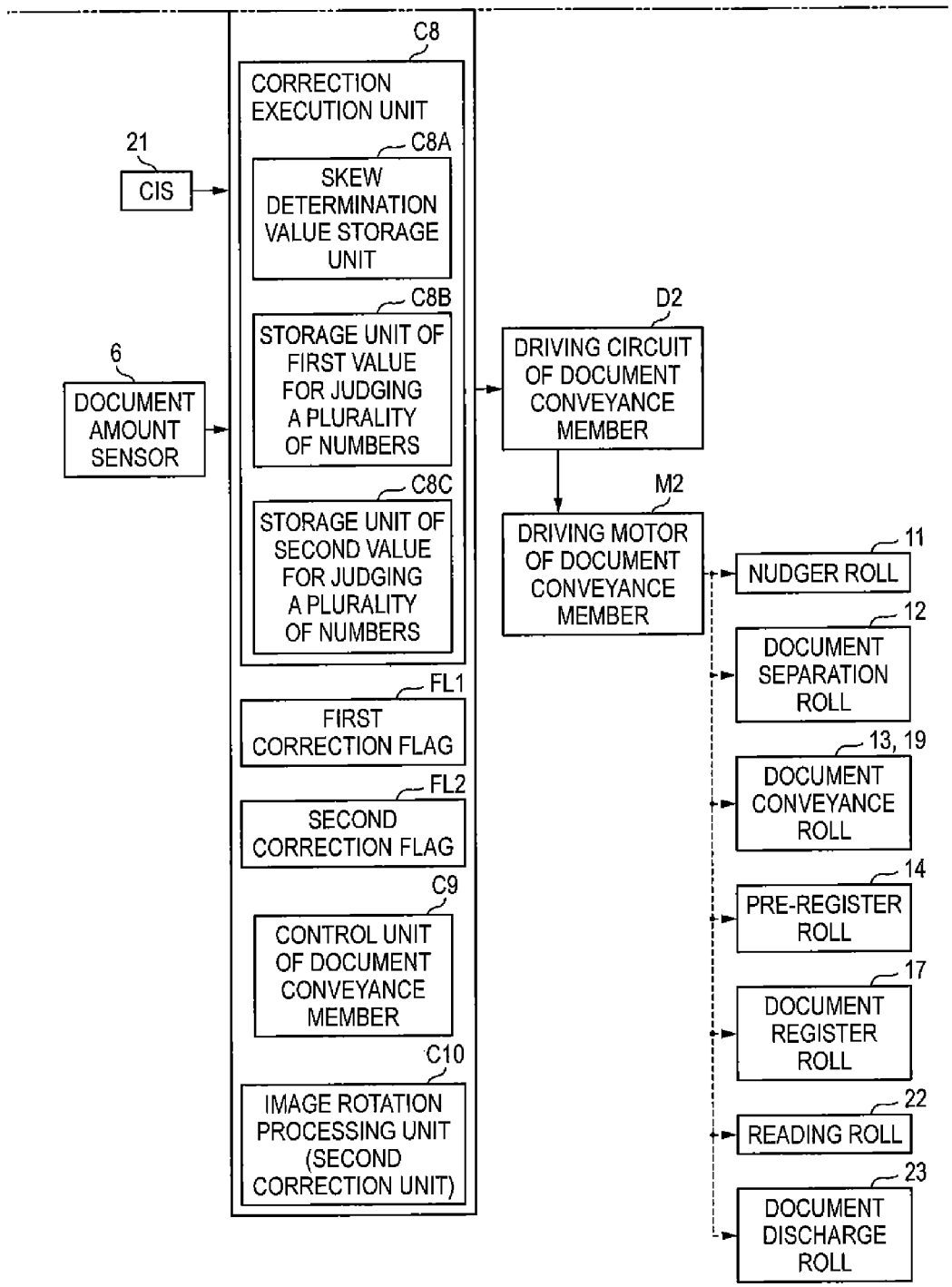

(CONT.)

(FIG. 16 CONTINUED)
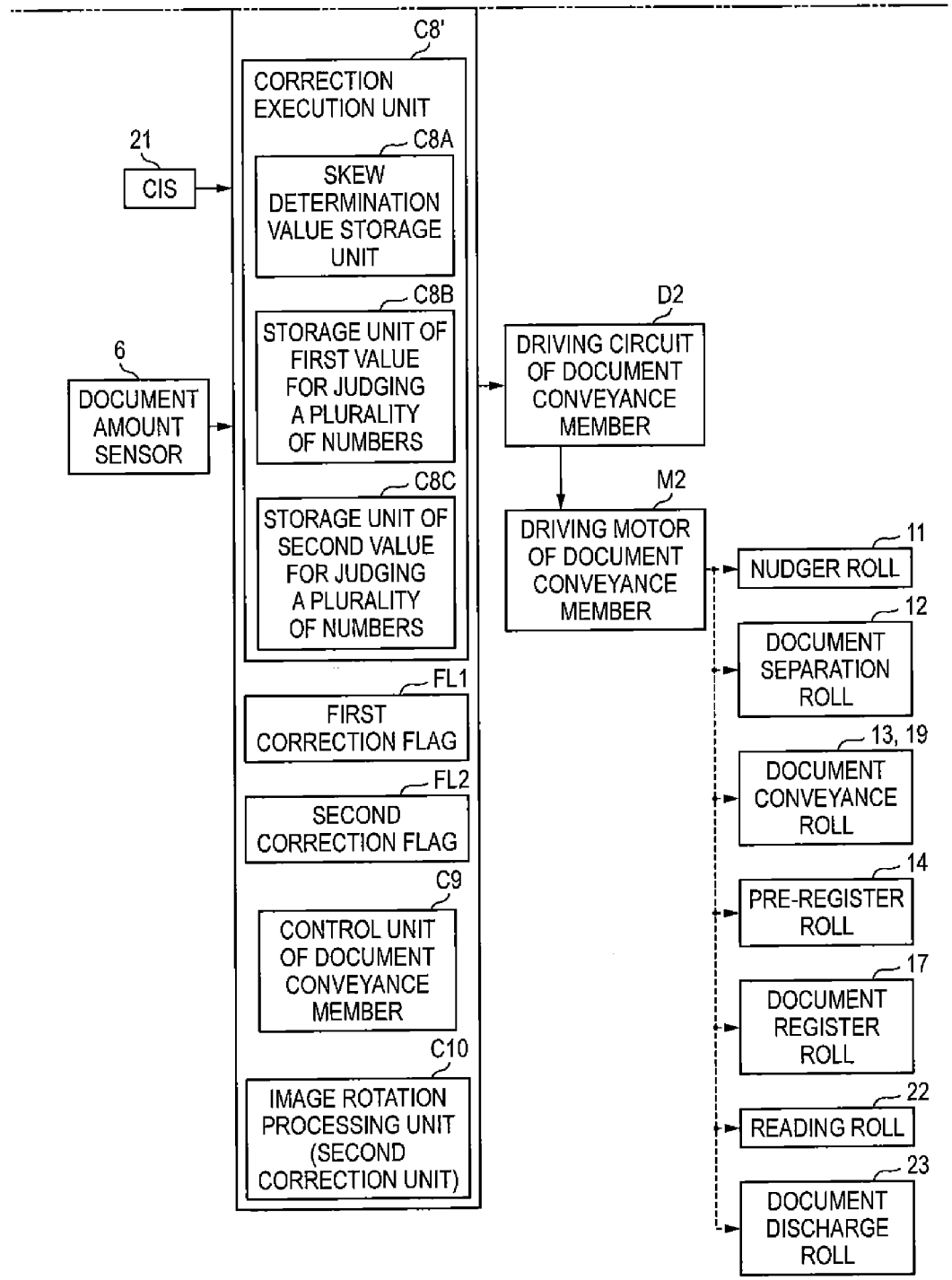

(CONT.)

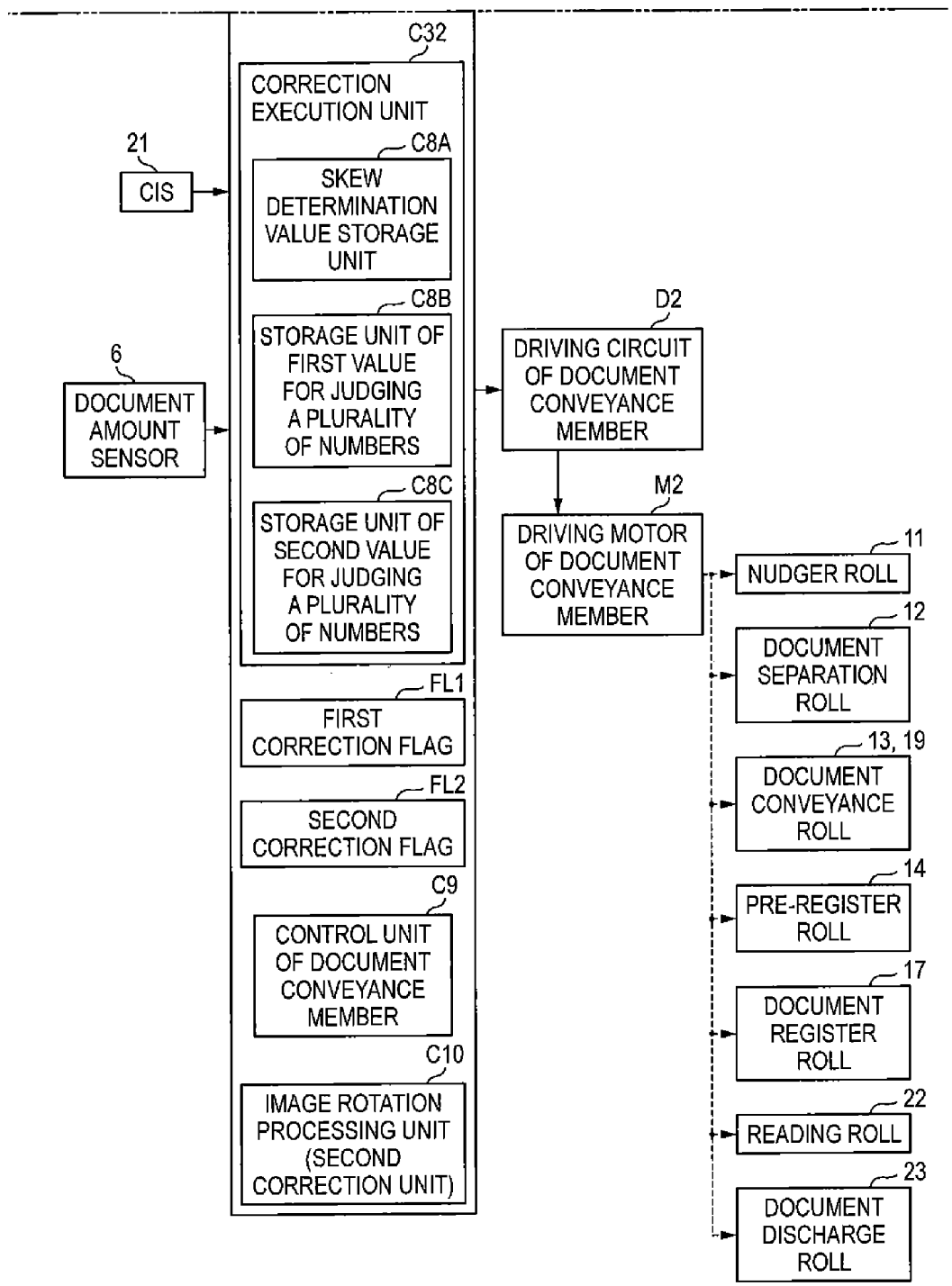

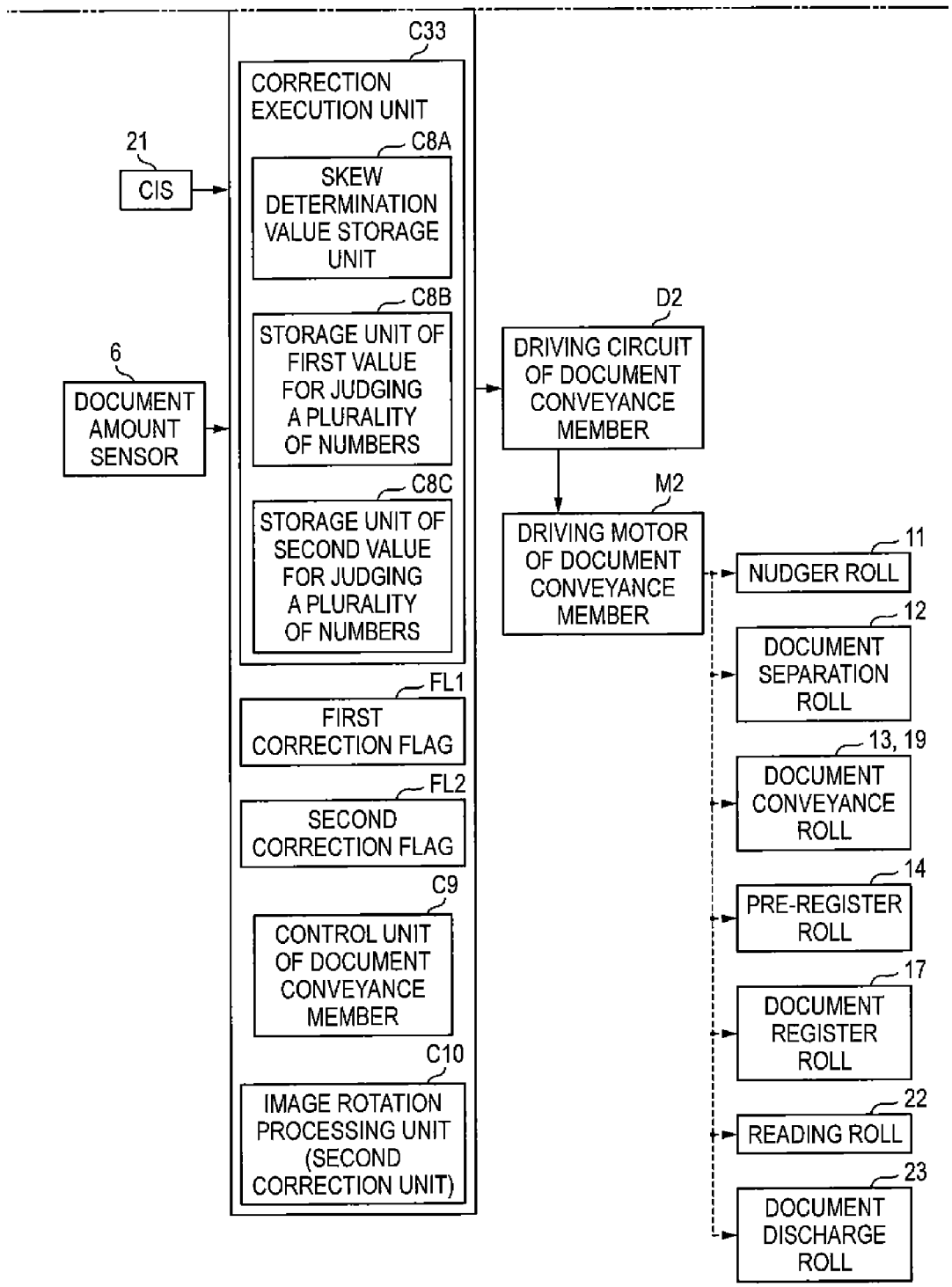
(FIG. 20 CONTINUED)

IMAGE FORMING APPARATUS AND IMAGE READING DEVICE

CROSS-REFERENCE TO RELATED APPLICATIONS

This application is based on and claims priority under 35 U.S.C. §119 from Japanese Patent Application No. 2014-064476 and Japanese Patent Application No. 2014-064477 both filed on Mar. 26, 2014.

TECHNICAL FIELD

The present invention relates to an image forming apparatus and an image reading device.

SUMMARY

According to a first aspect of the exemplary embodiments of the present invention, there is provided an image forming apparatus comprising: a loading unit capable of loading therein a plurality of documents; a document conveyance path to which the document is conveyed from the loading unit; a reading member configured to read an image of the document at a reading position set on the document conveyance path; a correction unit that corrects a skew of the document with respect to a conveying direction; and a correction execution unit that executes a correction by the correction unit when a number of copies of the document is larger than a preset number.

According to a second aspect of the exemplary embodiments of the present invention, there is provided an image forming apparatus comprising: a loading unit capable of loading therein a plurality of documents; a document conveyance path to which the document is conveyed from the loading unit; a reading member configured to read an image of the document at a reading position set on the document conveyance path; a correction unit that corrects a skew of the document with respect to a conveying direction; and a correction execution unit that executes a correction by the correction unit when a number of copies of the document is large and not executes the correction when the number of copies of the document is small.

According to a third aspect of the exemplary embodiments of the present invention, there is provided an image forming apparatus comprising: a loading unit capable of loading therein a plurality of documents; a document conveyance path to which the document is conveyed from the loading unit; a reading member configured to read an image of the document at a reading position set on the document conveyance path; a correction unit that corrects a skew of the document with respect to a conveying direction; and a correction execution unit that executes a correction by the correction unit when a number of copies of the document is large, depending on the number of copies of the document, from a state where the correction by the correction unit is not executed.

According to a fourth aspect of the exemplary embodiments of the present invention, there is provided an image reading device comprising: a loading unit capable of loading therein a plurality of documents; a document conveyance path to which the document is conveyed from the loading unit; a reading member configured to read an image of the document at a reading position set on the document conveyance path; a detection unit that detects a skew amount of the document with respect to a conveying direction; a correction unit that corrects and cancelling the skew of the document; a setting unit that sets whether or not to execute a correction by the correction unit; and a correction execution unit that changes the setting of the setting unit and executes the correction by the correction unit for a following document when the skew amount detected by the detection unit is larger than a preset skew amount.

According to a fifth aspect of the exemplary embodiments of the present invention, there is provided an image forming apparatus comprising: the image reading device configured to read an image of a document according to the above configuration, and an image recording device configured to record an image on a medium on the basis of the image read by the image reading device.

BRIEF DESCRIPTION OF THE DRAWINGS

Exemplary embodiments of the present invention will be described in detailed based on the following figures, wherein.

DETAILED DESCRIPTION

Figure 1:
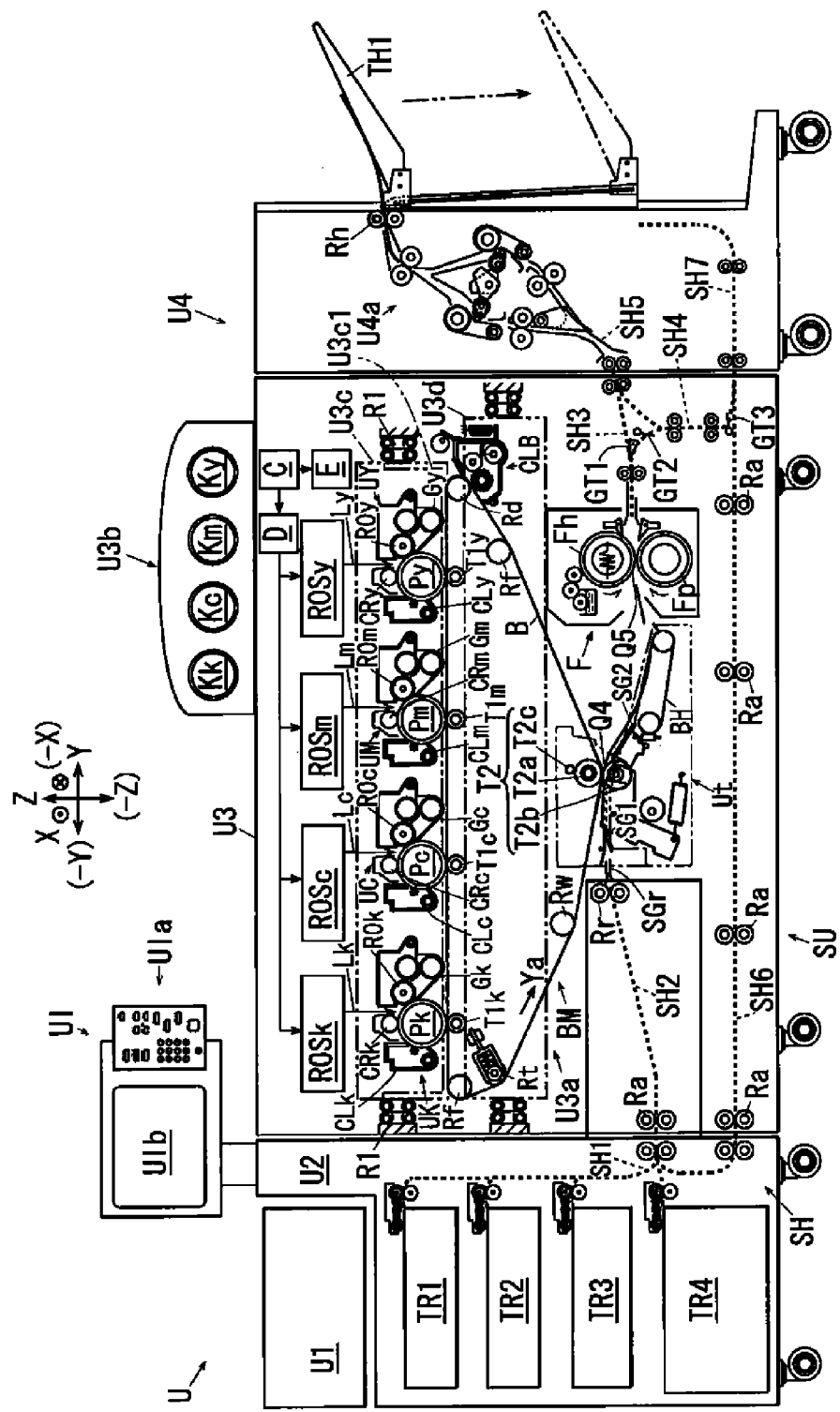
FIG. 1 is an overall illustration view of an image forming apparatus according to a first illustrative embodiment.

Hereinafter, illustrative embodiments of the present invention will be described with reference to the drawings. However, it should be noted that the present invention is not limited to the illustrative embodiments.

Meanwhile, in order to easily understand the following descriptions, a front-rear direction in the drawings is referred to as an X-axis direction, a left-right direction is referred to as a Y-axis direction, a vertical direction is referred to as a Z-axis direction, and directions or sides denoted with arrows X, –X, Y, –Y, Z, –Z are respectively referred to as a front direction, a rear direction, a right direction, a left direction, an upper direction, a lower direction or a front side, a rear side, a right side, a left side, an upper side and a lower side.

Also, in the drawings, '⊙' denotes an arrow facing from a backside of the sheet towards a front surface and ⊗ denotes an arrow facing from the front surface of the sheet towards a backside.

Meanwhile, in the below descriptions referring to the drawings, the members except for members necessary for the descriptions are not appropriately shown for easy understanding.

First Illustrative Embodiment

Figure 2:
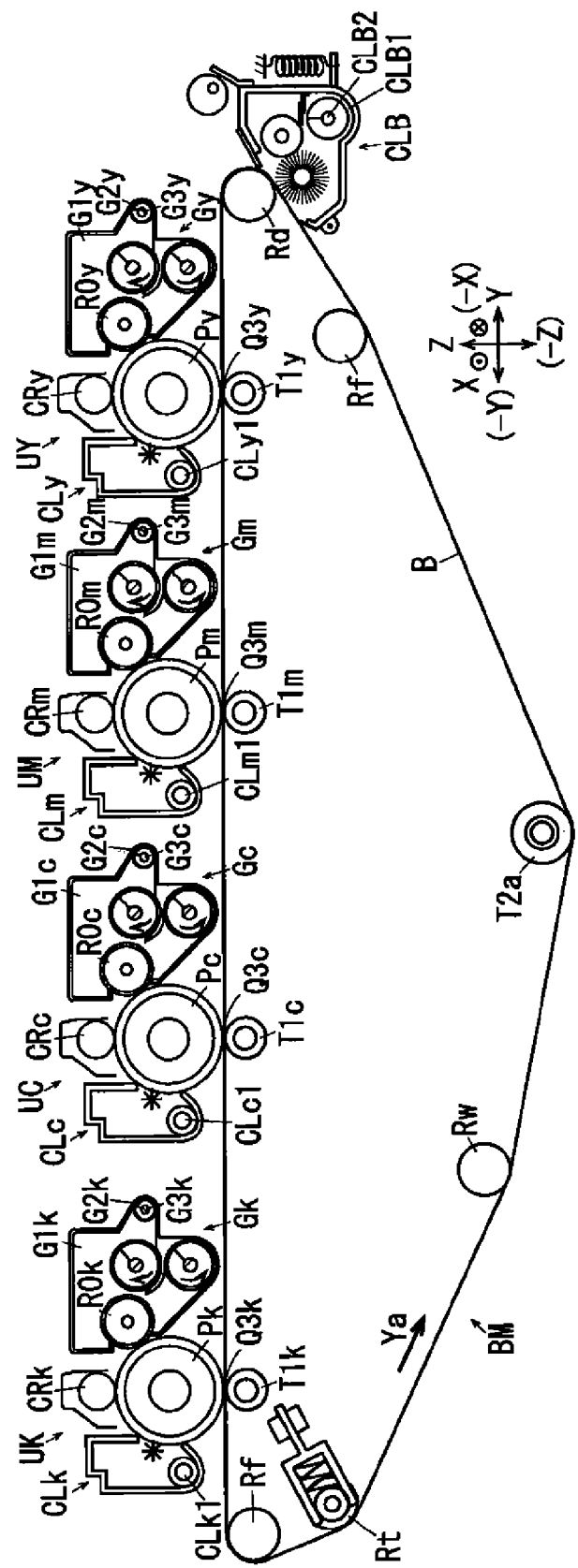
FIG. 2 is an enlarged illustration view of a visible image forming device according to the first illustrative embodiment.

FIG. 1 is an overall illustration view of an image forming apparatus according to a first illustrative embodiment. FIG. 2 is an enlarged illustration view of a visible image forming device according to the first illustrative embodiment.

In FIG. 1, a copying machine U, which is an example of an image forming apparatus, is provided with an operation unit UI, a scanner unit U1, which is an example of an image reading device, a feeder unit U2, which is an example of a medium feeding device, an image preparation unit U3, which is an example of an image recording device, and a medium processing device U4.

(Description of Operation Unit UI)

The operation unit UI is provided with an input button UIa used to start a copy operation or to set a number of sheets to be copied. Also, the operation unit UI is provided with a display unit UIb configured to display thereon a content input by the input button UIa and a status of the copying machine U.

(Description of Scanner Unit U1)

Figure 3:
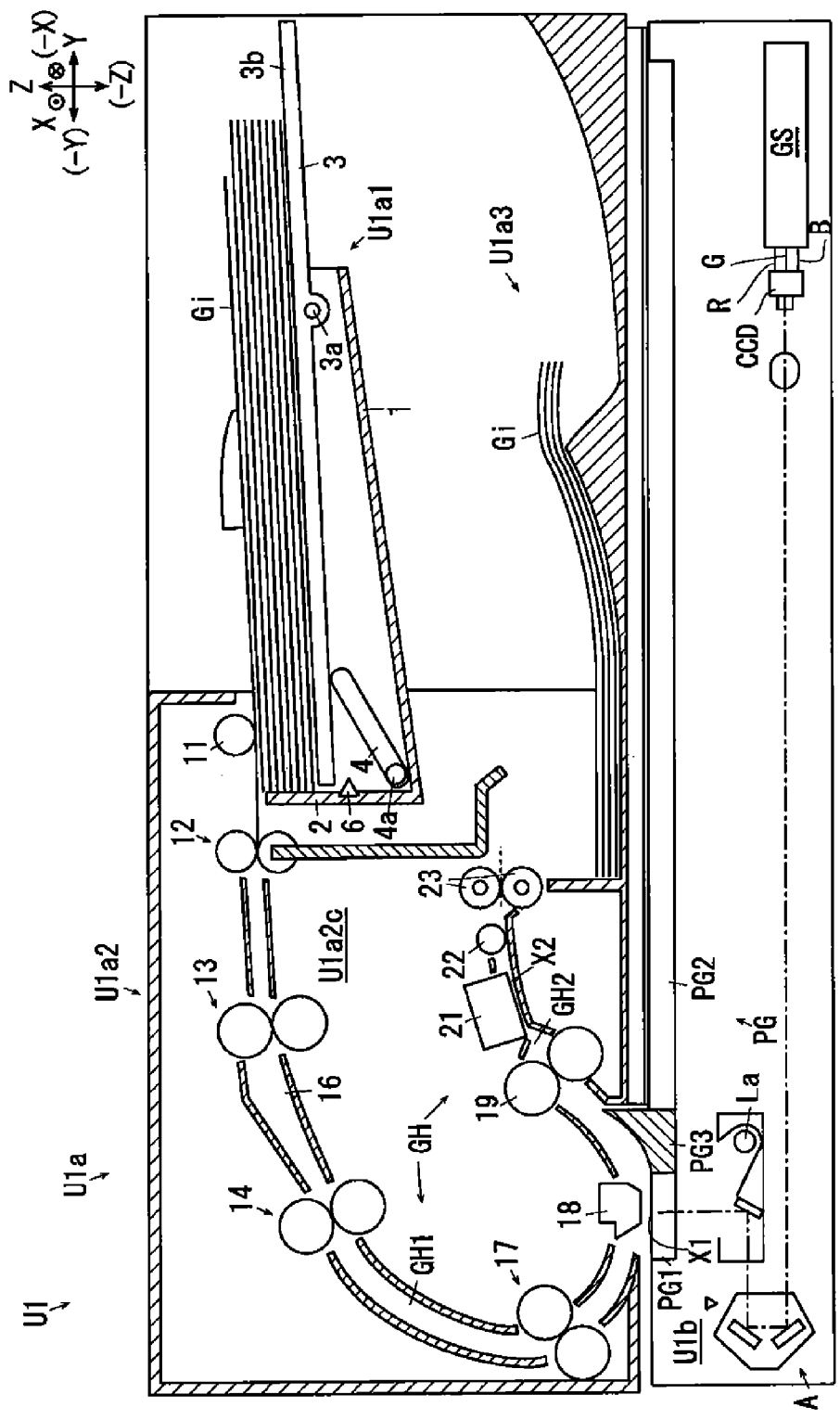
FIG. 3 is an overall illustration view of an image reading apparatus according to the first illustrative embodiment.

FIG. 3 is an overall illustration view of the image reading device according to the first illustrative embodiment.

In FIGS. 1 and 3, the scanner unit U1 has a scanner main body U1b having a transparent document platen PG at an upper end thereof, which is an example of a main body part of the image reading device. A document conveyance device U1a is supported to an upper surface of the scanner main body U1b so that the document platen PG can be opened and closed.

The document conveyance device U1a is provided with a document feeding tray U1a1, which is an example of a document loading unit and in which a plurality of documents Gi to be copied is accommodated with being overlapped. A document conveyance unit U1a2 is provided at the left of the document feeding tray U1a1. The document conveyance unit U1a2 is configured to convey the document Gi in the document feeding tray U1a1 onto the document platen PG. A document discharge tray U1a3, which is an example of a document discharge unit, is arranged below the document feeding tray U1a1. The document Gi having passed through the document platen PG is discharged to the document discharge tray U1a3 from the document conveyance unit U1a2.

In FIG. 3, a document passing surface PG1, which is an example of a first reading surface, is arranged at a left end portion of the document platen PG, in correspondence to a first predetermined image reading position X1. The document Gi being conveyed by the document conveyance device U1a passes through the document passing surface PG1. A document loading surface PG2 to which the documents G1 loaded by a user are supported is arranged at the right of the document passing surface PG1. A document guide PG3, which is an example of a guide member, is supported between the document passing surface PG1 and the document loading surface PG2. The document guide PG3 is configured to guide the document Gi having passed through the document passing surface PG1 into the document conveyance device U1a.

An exposure optical system A is supported in the scanner main body U1b. The exposure optical system A is provided with a lamp La, which is an example of a light source. The lamp La is configured to illuminate light to the document Gi passing through the document passing surface PG1 or the document Gi loaded on the document loading surface PG2. A reflected light from the document Gi is converted into electric signals of red R, green G and blue B in a solid-state imaging device CCD, which is an example of a first reading member, via a plurality of optical members of the exposure optical system A, and is then input to an image processing unit GS.

The image processing unit GS is configured to convert the electric signals of RGB input from the solid-state imaging device CCD into image information of black K, yellow Y, magenta M and cyan C, to temporarily store the same and to output the image information to a driving circuit D of a latent image forming device of the image preparation unit U3 at predetermined timing, as image information for latent image formation.

In the meantime, when a document image is a single-color image, so-called monochrome image, the image information of only black K is input to the driving circuit D of the latent image forming device.

The scanner main body U1b of the first illustrative embodiment is configured by the document platen PG, the exposure optical system A, the solid-state imaging device CCD and the image processing unit GS.

(Description of Feeder Unit U2)

In FIG. 1, the feeder unit U2 is provided with a plurality of sheet feeding trays TR1, TR2, TR3, TR4, which are examples of a medium accommodation container. Also, the feeder unit U2 has a medium feeding path SH1 configured to pick up a recording sheet S, which is an example of an image recording medium accommodated in each sheet feeding tray TR1 to TR4, and to convey the same to the image preparation unit U3, and the like.

(Description of Image Preparation Unit U3 and Medium Processing Device U4)

In FIG. 1, the image preparation unit U3 is provided with an image recording unit U3a configured to record an image on the recording sheet S conveyed from the feeder unit U2 on the basis of the document image read by the scanner unit U1.

In FIGS. 1 and 2, the driving circuit D of the latent image forming device of the image preparation unit U3 is configured to output driving signals corresponding to the image information input from the scanner unit U1 to latent image forming devices ROSy, ROSm, ROSc, ROSk of respective colors Y, M, C, K at predetermining timing, based on the image information. Photosensitive drums Py, Pm, Pc, Pk, which are examples of an image carrying member, are arranged below the respective latent image forming devices ROSy, ROSm, ROSc, ROSk. Surfaces of the rotating photosensitive drums Py, Pm, Pc, Pk are uniformly charged by charging rolls CRy, CRm, CRc, CRk, respectively, which are examples of a charger. On the charged surfaces of the photosensitive drums Py, Pm, Pc, Pk, electrostatic latent images are formed by laser beams Ly, Lm, Lc, Lk, which are examples of a latent image recording light output by the latent image forming devices ROSy, ROSm, ROSc, ROSk. The electrostatic latent images on the surfaces of the photosensitive drums Py, Pm, Pc, Pk are developed into toner images, which are examples of a visible image of yellow Y, magenta M, cyan C and black K, by developing devices Gy, Gm, Gc, Gk.

Meanwhile, developers consumed by the developing in the developing devices Gy, Gm, Gc, Gk are refilled from toner cartridges Ky, Km, Kc, Kk, which are examples of a developer accommodation container detachably mounted to a developer refill device U3b. In the first illustrative embodiment, two-component developer including toner serving as the developer and a carrier is used. From the toner cartridges Ky, Km, Kc, Kk, high-concentration developers in which a ratio of the toner is higher than toner concentrations in the developing devices Gy, Gm, Gc, Gk are refilled. Therefore, the developing devices Gy, Gm, Gc, Gk of the first illustrative embodiment are configured to be refilled with the high-concentration developers containing a small amount of the carriers and to discharge the developers containing the deteriorated carriers little by little to thus replace the carriers. In the meantime, since the technology of replacing the carrier little by little is well known, which is disclosed in Japanese Patent Application Publication Nos. 2000-81787A, 2003-84570A and the like, for example, the detailed description thereof is omitted.

The developers containing the deteriorated carriers in the developing devices Gy, Gm, Gc, Gk are discharged from deteriorated carrier discharge parts G1y, G1m, G1c, G1k at rear end portions of the developing devices Gy, Gm, Gc, Gk, and developers containing new carriers are refilled from the toner cartridges Ky, Km, Kc, Kk, so that the developers in the developing devices Gy, Gm, Gc, Gk are replaced little by little with the new developers. The developers discharged from the deteriorated carrier discharge parts G1y, G1m, G1c, G1k are introduced to deteriorated developer conveyance paths G2y, G2m, G2c, G2k extending rearwards, are conveyed rearwards by deteriorated developer conveyance members G3y, G3m, G3c, G3k arranged in the deteriorated developer conveyance paths G2y, G2m, G2c, G2k and are collected into a deteriorated developer collection member (not shown).

The toner images on the surfaces of the photosensitive drums Py, Pm, Pc, Pk are sequentially transferred with being overlapped in primary transfer regions Q3y, Q3m, Q3c, Q3k on an intermediate transfer belt B, which is an example of an intermediate transfer member, by primary transfer rolls T1y, T1m, T1c, T1k, which are examples of a primary transfer member, so that a color toner image, which is an example of a multicolor visible image, is formed on the intermediate transfer belt B. The color toner image formed on the intermediate transfer belt B is conveyed to a secondary transfer region Q4.

On the other hand, regarding the image information of only the black K, only the photosensitive drum Pk and developing device Gk of black K are used, so that only a toner image of black K is formed.

The residuals such as remaining developers and paper dusts attached on the surfaces of the photosensitive drums Py, Pm, Pc, Pk after the primary transfer are removed by drum cleaners CLy, CLm, CLo, CLk, which are examples of an image carrier cleaner.

In the first illustrative embodiment, the photosensitive drum Pk, the charging roll CRk and the drum cleaner CLk are integrated as a photosensitive unit UK of black K, which is an example of an image carrier unit. Also for the other colors Y, M, C, photosensitive units UY, UM, UC are configured by the photosensitive drums Py, Pm, Pc, the charging rolls Cry, CRm, CRc and the drum cleaners CLy, CLm, CLc.

Also, a visible image forming device Uk+Gk of block K is configured by the photosensitive unit UK of black K and the developing device Gk having a developing roll R0k, which is an example of a developer carrier. Also for the colors Y, M, C, visible image forming devices UY+Gy, UM+Gm, UC+Gc of yellow Y, magenta M and cyan C are configured by the photosensitive units UY, UM, UC of yellow Y, magenta M, cyan C and the developing devices Gy, Gm, Gc having developing rolls R0y, R0m, R0c.

A drawer U3c for a visible image forming device, which is an example of a drawer, is arranged below the latent image forming devices ROSy, ROSm, ROSc, ROSk of the respective colors Y, M, C, K. The drawer U3c for a visible image forming device is moveably supported by a pair of left and right slide rails R1, R1, which is an example of a guide member, between a drawing position at which the drawer is pulled to the front of the image preparation unit U3 and a mounting position at which the drawer is mounted in the image preparation unit U3.

The drawer U3c for a visible image forming device has a drawer main body U3c1, which is an example of a holder. The photosensitive units UY, UM, UC, UK and the developing devices Gy, Gm, Gc, Gk are detachably mounted to the drawer main body U3c1.

A drawer U3d for an intermediate transfer device, which is an example of a drawing member, is arranged below the drawer U3c for a visible image forming device. The drawer U3d for an intermediate transfer device is moveably supported between a drawing position at which the drawer is pulled to the front of the image preparation unit U3 and a mounting position at which the drawer is mounted in the image preparation unit U3. A belt module BM, which is an example of the intermediate transfer device, is supported by the drawer U3d for an intermediate transfer device so that it can be raised and lowered between an ascent position at which the belt module is contacted to lower surfaces of the photosensitive drums Py, Pm, Pc, Pk and a descent position spaced downwardly from the lower surfaces.

The belt module BM is provided with the intermediate transfer belt B, a driving roll Rd, which is an example of a driving member of the intermediate transfer member, a tension roll Rt, which is an example of a tension applying member, a walking roll Rw, which is an example of a serpentine prevention member, a plurality of idler rolls Rf, which is an example of a driven member, a backup roll T2a, which is an example of a facing member, and the primary transfer rolls T1y, T1m, T1c, T1k. In the meantime, a belt support roll Rd+Rt+Rw+Rf+T2a, which is an example of an intermediate transfer member supporting member, is configured by the driving roll Rd, the tension roll Rt, the walking roll Rw, the idler rolls Rf and the backup roll T2a. The intermediate transfer belt B is rotatably supported in an arrow Ya direction by the belt support roll Rd+Rt+Rw+Rf+T2a.

A secondary transfer unit Ut is arranged below the backup roll T2a. The secondary transfer unit Ut is provided with a secondary transfer roll T2b, which is an example of a secondary transfer member. The secondary transfer roll T2b is arranged so that it can be spaced from and pressed to the backup roll T2a with the intermediate transfer belt B being interposed therebetween. The secondary transfer region Q4 is formed by a region in which the secondary transfer roll T2b is contacted to the intermediate transfer belt B. Also, a contact roll T2c, which is an example of a power feeding member, is contacted to the backup roll T2a. The contact roll T2c is applied with a secondary transfer voltage having the same polarity as the charged polarity of the toner at predetermining timing from a power supply circuit E controlled by a control unit C.

A secondary transfer member T2 is configured by the backup roll T2a, the secondary transfer roll T2b and the contact roll T2c.

A medium conveyance path SH2 is arranged below the belt module BM. The recording sheet S fed from the medium feeding path SH1 of the feeder unit U2 is conveyed to register rolls Rr, which are an example of a conveyance timing adjustment member, by conveyance rolls Ra, which are an example of a medium conveyance member. The register rolls Rr are configured to convey the recording sheet S in a downstream direction in conformity to the timing at which the toner image formed on the intermediate transfer belt B is conveyed to the secondary transfer region Q4. The recording sheet S delivered by the register rolls Rr is guided by a sheet guide SGr at the register roll-side and a sheet guide SG1 before the transfer, so that it is conveyed to the secondary transfer region Q4.

Meanwhile, in the first illustrative embodiment, the sheet guide SGr at the register roll-side is fixed to the image preparation unit U3 together with the register rolls Rr.

When the toner image formed on the intermediate transfer belt B passes through the secondary transfer region Q4, it is transferred onto the recording sheet S by the secondary transfer member T2. In the meantime, regarding a color toner image, the toner images primarily transferred with being overlapped on the surface of the intermediate transfer belt B are collectively secondarily transferred to the recording sheet S.

A transfer device T1y to T1k+T2+B of the first illustrative embodiment is configured by the primary transfer rolls T1y, T1m, T1c, T1k, the secondary transfer member T2 and the intermediate transfer belt B.

After the secondary transfer, the intermediate transfer belt B is cleaned by a belt cleaner CLB, which is arranged at a downstream side of the secondary transfer region Q4 and is an example of an intermediate transfer member cleaner. The belt cleaner CLB is configured to remove the residuals, such as the developers and paper dusts without being transferred in the secondary transfer region Q4, from the intermediate transfer belt B. In FIG. 2, the residuals removed from the intermediate transfer belt B are introduced into a belt cleaner residual conveyance path CLB1, which is provided at a lower part in the belt cleaner CLB and extends rearwards, are conveyed to the rear side of the image preparation unit U3 by a belt cleaner residual conveyance member CLB2 arranged in the belt cleaner residual conveyance path CLB1 and are collected to the deteriorated developer collection member (not shown).

The recording sheet S having the toner image transferred thereto is guided by a sheet guide SG2 after transfer and is sent to a medium conveyance belt BH, which is an example of a conveyance member. The medium conveyance belt BH is configured to convey the recording sheet S to a fixing device F.

The fixing device F is provided with a heating roll Fh, which is an example of a heating member, and a pressing roll Fp, which is an example of a pressing member. The recording sheet S is conveyed to a fixing region Q5 that is a region in which the heating roll Fh and the pressing roll Fp are contacted to each other. The toner image of the recording sheet S is heated, pressed and fixed by the fixing device F while it passes through the fixing region Q5.

An image recording unit U3a of the first illustrative embodiment is configured by the visible image forming devices UY+Gy to Uk+Gk, the transfer devices T1y to T1k+T2+B and the fixing device F.

A switching gate GT1, which is an example of a switching member, is provided at a downstream side of the fixing device F. The switching gate GT1 is configured to selectively switch the recording sheet S having passed through the fixing region Q5 to any one of a discharge path SH3 of the medium processing device U4-side and a reverse path SH4. The recording sheet S conveyed to the discharge path SH3 is conveyed to a sheet conveyance path SH5 of the medium processing device U4. On the sheet conveyance path SH5, a curl correction member U4a, which is an example of a bending correction member, is arranged. The curl correction member U4a is configured to correct a bending, so-called curl of the introduced recording sheet S. The recording sheet S of which curl has been corrected is discharged with a sheet image fixing surface thereof being faced upwardly to a discharge tray TH1, which is an example of a medium discharge unit, by discharge rolls Rh, which are an example of a medium discharge member.

The recording sheet S conveyed to the sheet reverse path SH4 of the image preparation unit U3 by the switching gate GT1 passes through a second gate GT2, which is an example of a switching member, and is conveyed to the reverse path SH4 of the image preparation unit U3.

At this time, when discharging the recording sheet S with the image fixing surface thereof being faced downwardly, after a rear end of the recording sheet S in the conveyance direction passes through the second gate GT2, the conveyance direction of the recording sheet S is reversed. Here, the second gate GT2 of the first illustrative embodiment consists of a thin film-type elastic member. Therefore, the second gate GT2 is configured to enable the recording sheet S conveyed to the reverse path SH4 to pass through, as it is, and guides the recording sheet S having passed towards the conveyance paths SH3, SH5 when it is switched, so-called switched back. The switched back recording sheet S passes through the curl correction member U4a and is then discharged to the discharge tray TH1 with the image fixing surface being faced downwardly.

A circulation path SH6 is connected to the reverse path SH4 of the image preparation unit U3, and a third gate GT3, which is an example of the switching member, is arranged at the connection part. Also, a downstream end of the reverse path SH4 is connected to a reverse path SH7 of the medium processing device U4.

The recording sheet S having passed through the switching gate GT1 and conveyed to the reverse path SH4 is conveyed towards a reverse path SH7 of the medium processing device U4 by the third gate GT3. The third gate GT3 of the first illustrative embodiment consists of a thin film-type elastic member, like the second gate GT2. Therefore, the third gate GT3 is configured to enable the recording sheet S conveyed through the reverse path SH4 to pass through, and guides the recording sheet S having passed towards the circulation path SH6 when it is switched back.

The recording sheet S conveyed to the circulation path SH6 passes through the medium feeding path SH1 and is again sent to the secondary transfer region Q4, so that a second surface thereof is printed.

A sheet conveyance path SH is configured by the elements denoted with the reference numerals SH1 to SH7. Also, a sheet conveyance device SU of the first illustrative embodiment is configured by the elements denoted with the reference numerals SH, Ra, Rr, Rh, SGr, SG1, SG2, BH, GT1 to GT3.

(Description of Document Conveyance Device U1a)

In FIG. 3, the document feeding tray U1a1 of the document conveyance device U1a has a bottom part 1 and a left wall 2 extending upwardly from a left end of the bottom part 1. An elevating plate 3, which is an example of an elevating member, is supported to the bottom part 1 so that it can be rotated about a center of rotation 3a. An upper surface of the elevating plate 3 is formed with a loading surface 3b of the document.

An elevating rod 4, which is an example of a driving member for elevation, is contacted to a lower surface of a left end portion of the elevating plate 3. The elevating rod 4 is configured so that a driving from a driving source (not shown) can be transmitted to a center of rotation 4a thereof. Therefore, when the elevating rod 4 is rotated, the left end of the elevating plate 3 is moved up and down.

A document amount sensor 6, which is an example of a document amount detection member, is arranged at the front of the elevating plate 3. The document amount sensor 6 is configured to detect whether or not the elevating plate 3 or document Gi, thereby detecting an amount of the documents Gi. That is, when the elevating plate 3 ascends, if an amount of the documents Gi is small, the elevating plate 3 is moved upwardly beyond a height of the document amount sensor 6, so that the elevating plate 3 is not detected. On the other hand, when an amount of the documents Gi is large, the elevating plate 3 is located below the height of the document amount sensor 6, so that the elevating plate 3 or document Gi is detected by the document amount sensor 6. Therefore, based on the detection result of the document amount sensor 6 upon the ascent of the elevating plate 3, it is possible to detect whether an amount of the documents is larger than a preset amount or not.

A nudger roll 11, which is an example of a document acquisition member, is arranged above the left end portion of the elevating plate 3. Document separation rolls 12, which are an example of a document separation member, are arranged at the left of the nudger roll 11.

In the document conveyance unit U1a2, a document conveyance path GH to which the document Gi is conveyed is formed. The document conveyance path GH includes a first document conveyance path GH1 bent in an arc shape from the document separation rolls 12 towards the first image reading position X1 and a second document conveyance path GH2 extending from the first image reading position X1 to the document discharge tray U1a3.

On the first document conveyance path GH1, document conveyance rolls 13, which are an example of the document conveyance member, are arranged at a downstream side of the document separation rolls 12 in a document conveying direction. Pre-register rolls 14, which are an example of a correction unit and a first correction unit, are arranged at a downstream side of the document conveyance rolls 13. In the meantime, on the first document conveyance path GH1 of the first illustrative embodiment, a loop space 16, which is an example of a medium-bendable space and has a wider conveyance path interval than the other parts, is formed between the document conveyance rolls 13 and the pre-register rolls 14.

Document register rolls 17, which are an example of a document conveyance timing adjustment member, are arranged at a downstream side of the pre-register rolls 14. A pad 18, which is an example of a document pressing member, is arranged at a downstream side of the document register rolls 17, in correspondence to the upper of the first image reading position X1.

On the second document conveyance path GH2, document conveyance rolls 19, which are an example of the document conveyance member, are arranged at a downstream side of the pad 18. An image reading sensor 21, which is an example of a second reading member, is arranged at a position corresponding to a second predetermined reading position X2 at a downstream side of the document conveyance rolls 19. In the meantime, the image reading sensor 21 of the first illustrative embodiment consists of a CIS (Contact Image Sensor).

A reading roll 22, which is an example of a reading auxiliary member, is arranged at a downstream side of the image reading sensor 21. Document discharge rollers 23 configured to discharge the document Gi to the document discharge tray U1a3 are arranged at a downstream side of the reading roll 22.

(Functions of Document Conveyance Device U1a)

In the document conveyance device U1a having the above-described configuration, when the document Gi is read, the elevating plate 3 is moved upwardly until an upper surface of the document Gi is contacted to the nudger roll 11, as shown in FIG. 3. Then, the nudger roll 11 is rotated to deliver the document Gi. The documents Gi delivered by the nudger roll 11 are separated one by one by the document separation rolls 12. The separated document Gi is conveyed to the pre-register rolls 14 by the document conveyance rolls 13. Here, when forming a so-called loop by bending the document Gi, the document is conveyed by the document conveyance rolls 13 at a state where the rotations of the pre-register rolls 14 are stopped. Therefore, the document Gi is bent in the loop space 16 and a leading end of the document Gi colliding with the pre-register rolls 14 is aligned. After the leading end of the document Gi is aligned, the document Gi is conveyed towards the downstream side by the pre-register rolls 14. On the other hand, when a loop is not formed, the document Gi delivered by the document conveyance rolls 13 is conveyed towards the downstream side by the pre-register rolls 14.

The document Gi conveyed by the pre-register rolls 14 is conveyed to the first image reading position X1 in exact timing by the document register rolls 17. The document Gi passing through the first image reading position X1 is image-read by the solid-state imaging device CCD through the exposure optical system A.

The document Gi having passed through the first image reading position X1 is conveyed by the document conveyance rolls 19 and is delivered to the second image reading position X2. When reading both sides of the document Gi, the image reading sensor 21 reads a surface of the document Gi passing through the second image reading position X2, which is an opposite surface to the surface of the document read by the solid-state imaging device CCD. Meanwhile, in the first illustrative embodiment, when reading an image by the image reading sensor 21, the reading roll 22 presses the document Gi, so that an interval between the document Gi and the image reading sensor 21 can be easily stabilized. The document Gi having passed through the second image reading position X2 is discharged to the document discharge tray U1a3 by the document discharge rollers 23.

Description of Control Unit of First Illustrative Embodiment

Figure 4:
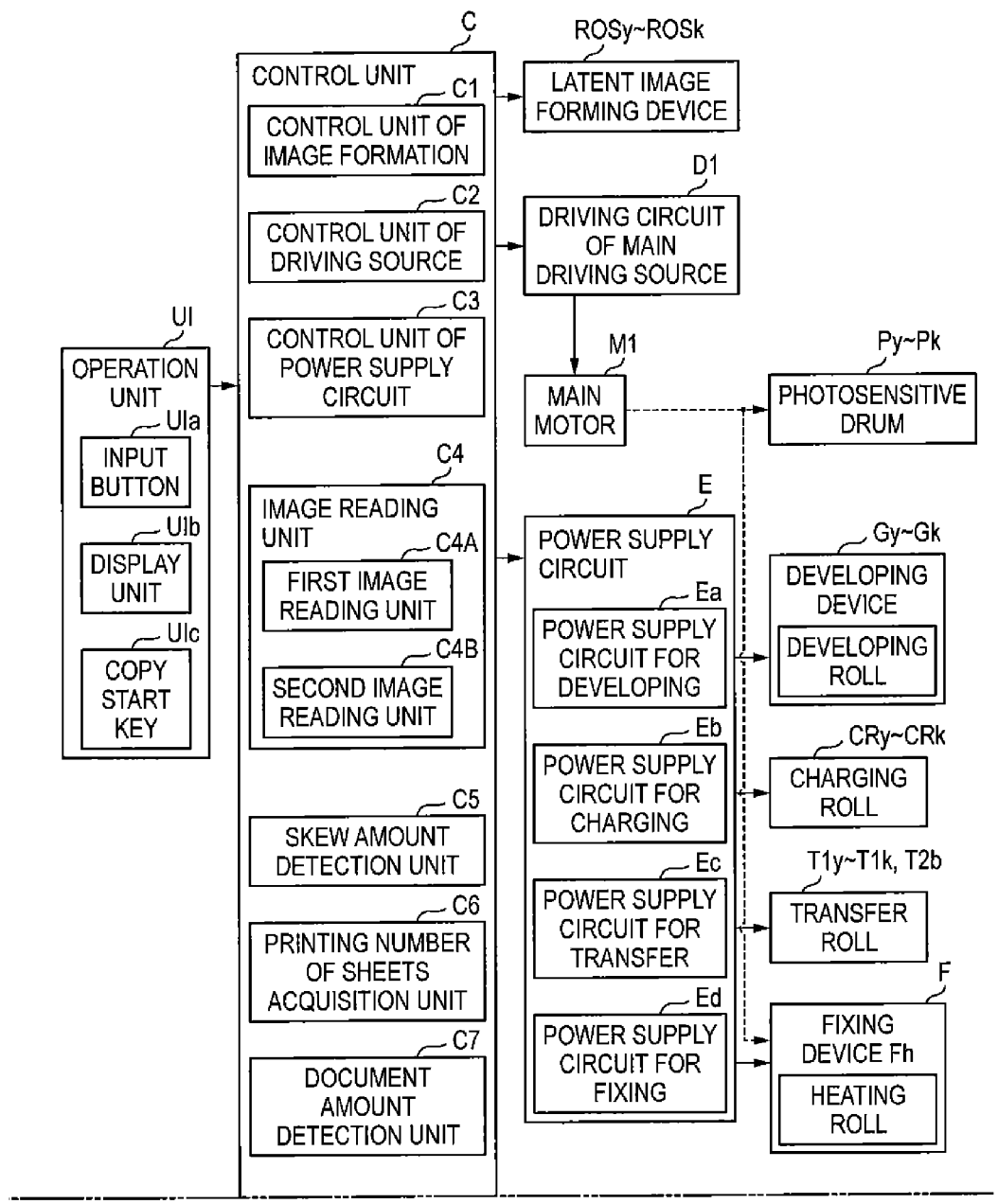
FIG. 4 is a block diagram showing respective functions of a control unit of the image forming apparatus according to the first illustrative embodiment.

FIG. 4 is a block diagram showing respective functions of the control unit of the image forming apparatus according to the first illustrative embodiment.

In FIG. 4, a control unit C of the image preparation unit U3 has an input/output interface I/O for performing signal input and output processing and the like with the outside. Also, the control unit C has a ROM (Read Only Memory) in which a program, information and the like for performing necessary processing are stored. Also, the control unit C has a RAM (Read Only Memory) for temporarily storing the necessary data. Also, the control unit C has a CPU (Central Processing Unit) configured to perform processing corresponding to the program stored in the ROM and the like. Therefore, the control unit C of the first illustrative embodiment consists of a small information processing unit, so-called microcomputer. Thus, the control unit C can implement a variety of functions by executing the program stored in the ROM and the like.

(Signal Output Elements Connected to Control Unit C of Image Preparation Unit U3)

The control unit C of the image preparation unit U3 is input with output signals from signal output elements such as the operation unit UI, the solid-state imaging element CCD, the image reading sensor 21 and the like.

The operation unit UI has an input button UIa configured to input a number of sheets to be printed, an arrow and the like, a display unit UIb, and a copy start key UIc, which is an example of an input member configured to perform an input for starting a copy operation and a reading operation of the document Gi.

The solid-state imaging element CCD is configured to read an image of a first surface of the document Gi passing through the first image reading position X1.

The image reading sensor 21 is configured to read an image of a second surface of the document Gi passing through the second image reading position X2.

(Controlled Elements Connected to Control Unit C of Image Preparation Unit U3)

The control unit C of the image preparation unit U3 is connected to a driving circuit D1 of a main driving source, a power supply circuit E, a driving circuit D2 of the document conveyance member and the other control elements (not shown). The control unit C is configured to output control signals to the respective circuits D1, D2, E and the like.

D1: Driving Circuit of Main Driving Source

The driving circuit D1 of a main driving source is configured to rotate the photosensitive drums Py, Pm, Pc, Pk, the intermediate transfer belt B and the like through a main motor M1, which is an example of the main driving source.

D2: Driving Circuit of Document Conveyance Member

The driving circuit D2 of the document conveyance member is configured to rotate the nudger roll 11, the document separation rolls 12 and the like through a driving motor M2 of the document conveyance member, which is an example of the driving source, a gear train, an electromagnetic clutch and the like, which are not shown.

E: Power Supply Circuit

The power supply circuit E has a power supply circuit Ea for developing, a power supply circuit Eb for charging, a power supply circuit Ec for transfer, a power supply circuit Ed for fixing, and the like.

Ea: Power Supply Circuit for Developing

The power supply circuit Ea for developing is configured to apply a developing voltage to the developing rolls of the developing devices Gy, Gm, Gc, Gk.

Eb: Power Supply Circuit for Charging

The power supply circuit Eb for charging is configured to apply a charging voltage for charging the surfaces of the photosensitive drums Py, Pm, Pc, Pk to the respective charging rolls CRy, CRm, CRc, CRk.

Ec: Power Supply Circuit for Transfer

The power supply circuit Ec for transfer is configured to apply a transfer voltage to the secondary transfer roll T2b through the primary transfer rolls T1y, T1m, T1c, T1k or contact roll T2c.

Ed: Power Supply Circuit for Fixing

The power supply circuit Ed for fixing is configured to feed power for heating a heater to the heating roll Fh of the fixing device F.

(Functions of Control Unit C of Image Preparation Unit U3)

The control unit C of the image preparation unit U3 has a function of executing processing in accordance with the input signals from the signal output elements, thereby outputting control signals to the respective control elements. That is, the control unit C has following functions.

C1: Control Unit of Image Formation

A control unit C1 of image formation is configured to control the driving of the respective members of the copying machine U and the applying timings of the respective voltages in accordance with the image information input from the solid-state imaging element CCD or image reading sensor 21 of the scanner unit U1, thereby executing a job that is an image forming operation.

C2: Control Unit of Driving Source

A control unit C2 of a driving source is configured to control the driving of the main motor M1 through the driving circuit D1 of the main driving source, thereby controlling the driving of the photosensitive drums Py, Pm, Pc, Pk, and the like.

C3: Control Unit of Power Supply Circuit

A control unit C3 of a power supply circuit is configured to control the respective power supply circuits Ea to Ed, thereby controlling the voltages applied to the respective members and the power fed to the respective members.

C4: Image Reading Unit

An image reading unit C4 has a first image reading unit C4A and a second image reading unit C4B and is configured to read an image of the document Gi by the scanner unit U1.

C4A: First Image Reading Unit

The first image reading unit C4A is configured to read an image of a first surface of the document Gi passing through the first image reading position X1, based on the input from the solid-state imaging element CCD.

C4B: Second Image Reading Unit

The second image reading unit C4B is configured to read an image of a second surface of the document Gi passing through the second image reading position X2, based on the input from the image reading sensor 21.

C5: Skew Amount Detection Unit

A skew amount detection unit C5 is configured to measure a skew amount of the document Gi with respect to the document conveying direction. In the first illustrative embodiment, for example, the skew amount detection unit C5 is configured to detect a skew amount of a front end of the document Gi in the conveying direction with respect to a main scanning direction, i.e., a front-rear direction which is a direction intersecting with the conveying direction, based on the reading results of the respective reading members CCD, 21. Therefore, as an example of the skew amount, a lead skew amount sk1 is measured. In the meantime, the lead skew amount is detected as a deviation amount sk1 [mm] of the other end in a sub-scanning direction relative to one end in the main scanning direction, with respect to a width 200 [mm] in the main scanning direction. Therefore, a skewed angle $\theta 1$ of the front end is expressed by $\tan \theta 1$ (=sk1/200). Meanwhile, in the first illustrative embodiment, the case where the read skew amount is detected is exemplified. However, the present invention is not limited thereto, and a skew amount of a side edge of the document Gi in a width direction with respect to the conveying direction, so-called side skew amount may be also used.

C6: Printing Number of Sheets Acquisition Unit

A printing number of sheets acquisition unit C6 is configured to acquire a number of sheets to be printed N1 input from the operation unit UI.

C7: Document Amount Detection Unit

A document amount detection unit C7 is configured to detect whether an amount of documents is larger than a preset amount, based on a detection result of the document amount sensor 6.

C8: Correction Execution Unit

A correction execution unit C8 has a skew determination value storage unit C8A, a storage unit C8B of a first value for judging a plurality of numbers and a storage unit C8C of a second value for judging a plurality of numbers, and is configured to execute an operation of correcting a skew of the document Gi. In the first illustrative embodiment, when the skew amount sk1 detected by the skew amount detection unit C5 is larger than a preset skew amount ska, the correction execution unit C8 executes a correction by the pre-register rolls 14 for a next document Gi. On the other hand, when the skew amount sk1 detected by the skew amount detection unit C5 is equal to or smaller than the preset skew amount ska, the correction execution unit C8 of the first illustrative embodiment executes the correction by an image rotation processing unit C10, which is an example of a second correction unit and will be described later. Also, when the number of sheets to be printed N1, which is an example of a number of copies of the document Gi, is larger than a first value Na for judging a plurality of numbers, which is an example of a preset number, the correction execution unit C8 of the first illustrative embodiment executes the correction by the pre-register rolls 14. Also, when the number of sheets to be printed N1 of the document Gi is equal to or smaller than the first value Na for judging a plurality of numbers and is larger than a second value Nb for judging a plurality of numbers, which is an example of a second preset number smaller than the first value Na for judging a plurality of numbers, and the amount of the documents Gi is also larger than a preset amount of documents, the correction execution unit C8 of the first illustrative embodiment executes the correction by the pre-register rolls 14. On the other hand, when the number of sheets to be printed N1 of the document Gi is equal to or smaller than the second value Nb for judging a plurality of numbers or the amount of the documents Gi is smaller than the preset amount of documents, the correction execution unit C8 of the first illustrative embodiment executes the correction by the image rotation processing unit C10.

C8A: Skew Determination Value Storage Unit

The skew determination value storage unit C8A is configured to store therein a determination value ska, which is an example of the preset skew amount, so as to determine whether the skew amount sk1 of the document Gi is large or not.

C8B: Storage Unit of First Value for Judging Plurality of Numbers

The storage unit C8B of a first value for judging a plurality of numbers is configured to store therein the first value Na for judging a plurality of numbers for determining whether the number of sheets to be printed N1 of the document Gi is large or not. In the first illustrative embodiment, Na=10 [sheets] is stored as an example of the first value Na for judging a plurality of numbers.

C8C: Storage Unit of Second Value for Judging Plurality of Numbers

The storage unit C8C of a second value for judging a plurality of numbers is configured to store therein the second value Nb for judging a plurality of numbers for determining how many the number of sheets to be printed N1 of the document Gi not larger than the first value Na for judging a plurality of numbers is. In the first illustrative embodiment, N=5 [sheets] is stored as an example of the second value Nb for judging a plurality of numbers.

FL1: First Correction Flag

A first correction flag FL1 has an initial value of '0', and is '1' when the skew correction of the document Gi is performed by the pre-register rolls 14 through the determination and setting of the correction execution unit C8, i.e., when a mechanical register is made, and is '0' when the mechanical register is not made.

FL2: Second Correction Flag

A second correction flag FL2 has an initial value of '0', and is '1' when the skew correction of the document Gi is performed by the image rotation processing unit C10 through the determination and setting of the correction execution unit C8, i.e., when an image processing register is made, and is '0' when the image processing register is not made.

C9: Control Unit of Document Conveyance Member

A control unit C9 of the document conveyance member is configured to control the driving of the nudger roll 11 and the like through the driving circuit D2 of the document conveyance member. When correcting the skew by the pre-register rolls 14, the control unit C9 of the document conveyance member of the first illustrative embodiment controls the respective rolls 11 to 23 so that a loop is formed in the loop space 16. That is, the document is conveyed by the document conveyance rolls 13 at a state where the pre-register rolls 14 are stationary. Thereby, the document Gi is bent in the loop space 16, so that the leading end of the document Gi colliding with the pre-register rolls 14 is aligned. After the leading end of the document Gi is aligned, the pre-register rolls 14 are driven to convey the document Gi towards the downstream side. When the skew is not corrected by the pre-register rolls 14, the respective rolls 11 to 23 are controlled so that a loop is not formed in the loop space 16. That is, while the rotations of the pre-register rolls 14 are not stopped, the pre-register rolls 14 are rotated together with the document conveyance rolls 13, thereby conveying the document Gi towards the downstream side.

C10: Image Rotation Processing Unit

When an image of the document Gi is read, the image rotation processing unit C10, which is an example of the second correction unit, rotates the image in a skew correction direction, based on the skew of the document Gi. That is, a skew-corrected image is printed in the image preparation unit U3. The image rotation processing unit C10 of the first illustrative embodiment is configured to rotate the read image by a correction amount (−sk1) cancelling the skew amount sk1, based on the skew amount sk1 measured when the image of the document Gi is read.

Description of Flowchart of First Illustrative Embodiment

Subsequently, a control flow of the copying machine U according to the first illustrative embodiment is described with reference to a flowchart.

(Description of Flowchart of Skew Correction Processing)

Figure 5:
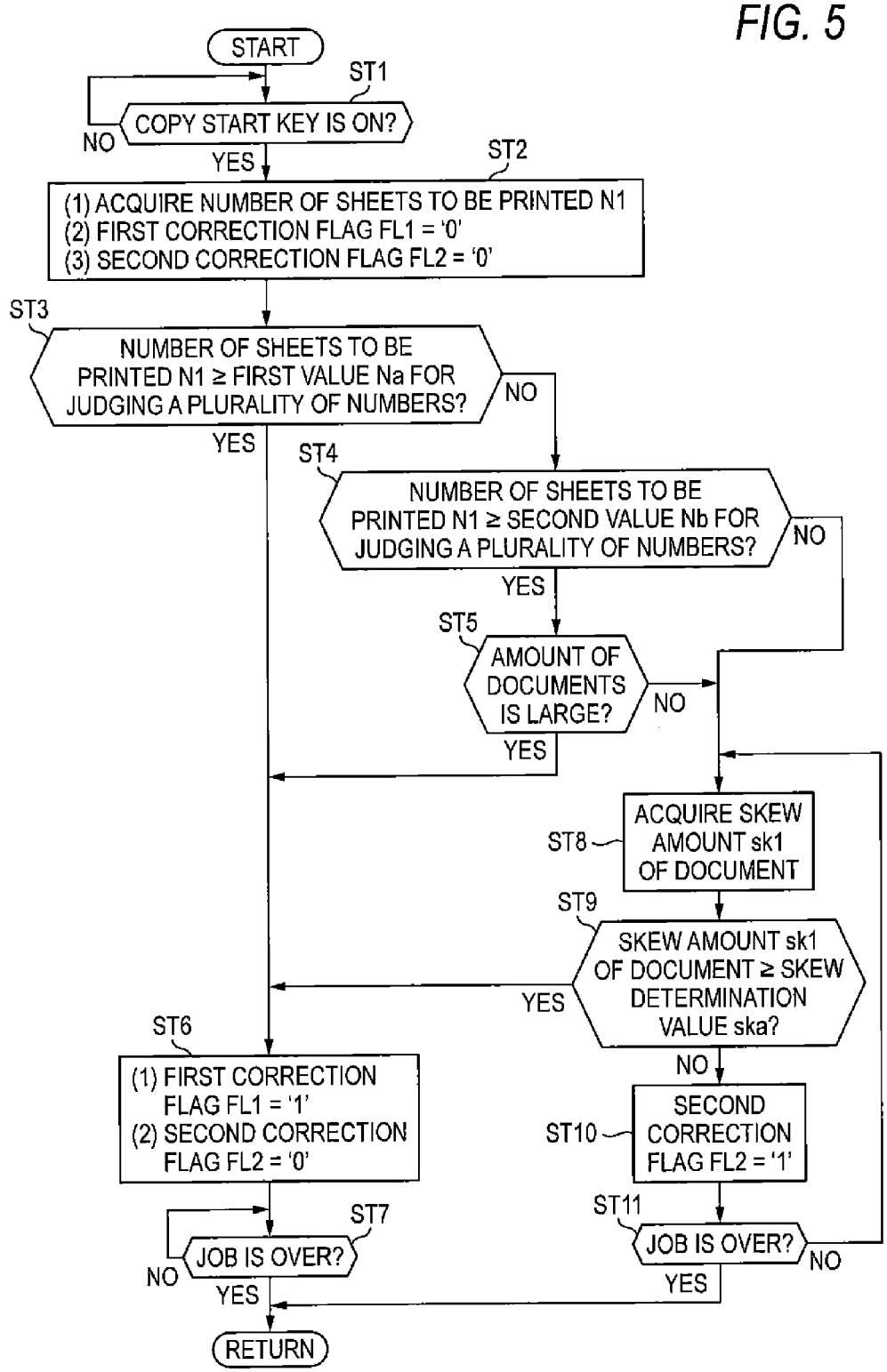
FIG. 5 is a flowchart showing skew correction processing according to the first illustrative embodiment.

FIG. 5 is a flowchart of the skew correction processing of the first illustrative embodiment.

In the flowchart of FIG. 5, each step ST is processed in accordance with the program stored in the control unit C of the copying machine U. Also, the processing is executed in parallel with the other processing of the copying machine U.

The flowchart of FIG. 5 starts when the power is input to the copying machine U.

In step ST1 of FIG. 5, the control unit C determines whether the copy start key UIc is input. When a result of the determination is YES (Y), the control unit C proceeds to step ST2, and when a result thereof is NO (N), the control unit C repeats step ST1.

In step ST2, the control unit C executes processing (1) of acquiring the number of sheets to be printed N1, processing (2) of initializing the first correction flag FL1 to '0' and processing (3) of initializing the second correction flag FL2 to '0' and then proceeds to step ST3.

In step ST3, the control unit C determines whether the number of sheets to be printed N1 is equal to or larger than the first value Na for judging a plurality of numbers. When a result of the determination is NO (N), the control unit C proceeds to step ST4, and when a result thereof is YES (Y), the control unit C proceeds to step ST6.

In step ST4, the control unit C determines whether the number of sheets to be printed N1 is equal to or larger than the second value Nb for judging a plurality of numbers. When a result of the determination is YES (Y), the control unit C proceeds to step ST5, and when a result thereof is NO (N), the control unit C proceeds to step ST8.

In step ST5, the control unit C determines whether the amount of the documents Gi is large or not, based on a detection result of the document amount sensor 6. When a result of the determination is YES (Y), the control unit C proceeds to ST6, and when a result thereof is NO (N), the control unit C proceeds to step ST8.

In step ST6, the control unit C executes processing (1) of setting the first correction flag FL1 to '1' and processing (2) of setting the second correction flag FL2 to '0' and then proceeds to step ST7.

In step ST7, the control unit C determines whether the job is over, i.e., whether the reading operation of all the documents Gi is over. When a result thereof is NO (N), the control unit C repeats step ST7, and when a result thereof is YES (Y), the control unit C returns to step ST1.

In step ST8, the control unit C detects the skew amount sk1 of the document Gi. Then, the control unit C proceeds to step ST9.

In step ST9, the control unit C determines whether the skew amount sk1 is equal to or larger than the skew determination value ska. When a result of the determination is YES (Y), the control unit C proceeds to ST6, and when a result thereof is NO (N), the control unit C proceeds to step ST10.

In step ST10, the control unit C sets the second correction flag FL2 to '1' and then proceeds to step ST11.

In step ST11, the control unit C determines whether the job is over. When a result of the determination is NO (N), the control unit C returns to ST8, and when a result thereof is YES (Y), the control unit C returns to step ST1.

(Operations of Skew Correction Processing)

In the copying machine U of the first illustrative embodiment having the above-described configuration, when reading the document Gi, if the number of sheets to be printed N1 is equal to or larger than the first value Na for judging a plurality of numbers, the skew is corrected using the pre-register rolls 14. When the number of sheets to be printed N1 is large, if the document Gi is read with being skewed without the skew correction, the skewed image is printed as the large number of sheets to be printed N1. Therefore, as the printing is again performed, the waste of sheets is increased or the total number of sheets to be re-printed is increased, which causes the labor.

Also, when the number of sheets to be printed N is smaller than the first value Na for judging a plurality of numbers and is equal to or larger than the second value Nb for judging a plurality of numbers and the amount of the documents is large, the total number of sheets to be printed (=the amount of documents×the number of sheets to be printed N1) is increased. Therefore, when the document Gi is read with being skewed, the problems such as the waste of sheets are likewise caused.

In contrast, according to the first illustrative embodiment, when the number of sheets to be printed N1 is equal to or larger than the first value Na for judging a plurality of numbers and when the amount of documents is large, the skew is corrected using the pre-register rolls 14. Thereby, the skewed reading of the document Gi is reduced, so that a quality of the read image is improved. Also, the problems such as the waste of sheets are suppressed. On the other hand, according to the first illustrative embodiment, even when the number of sheets to be printed N1 is small or when the amount of documents is small, if an image is skewed, the tiling is corrected in the image processing.

Also, according to the first illustrative embodiment, when the skew amount sk1 of the document Gi is equal to or larger than the skew determination value ska, the skew is corrected using the pre-register rolls 14. On the other hand, when the skew amount sk1 is smaller than the skew determination value ska, i.e., when a degree of the skew is small, the skew is corrected in the image processing. When the skew amount sk1 is large, if it is intended to correct the skew with only the image processing, a part of the image may be missed upon the reading or a storage capacity may be exceeded. Therefore, when the skew amount sk1 is large, the skew may not be all corrected in the image processing. In contrast, according to the first illustrative embodiment, when the skew amount sk1 is large, the skew is corrected using the pre-register rolls 14. Therefore, when the skew amount sk1 is large, a situation where the skew cannot be completely corrected is suppressed, so that a printing of the skewed image is reduced.

Also, according to the first illustrative embodiment, the skew amount sk1 is detected every document Gi, and when there is a document Gi of which skew amount sk1 is equal to or larger than the determination value ska, it is estimated that a skew amount sk1 of a next document Gi and thereafter is also large, and the skew correction using the pre-register rolls 14 is performed for the next document Gi and thereafter. In the feeder unit U2, when introducing the document Gi by the nudger roll 11, the document Gi being introduced may upset a posture of the document Gi loaded in the document feeding tray U1a1. Thereby, even when the skew amount sk1 is originally small in a bundle of documents, the skew amount sk1 is gradually increased, so that a reading image quality may be deteriorated from the middle of the bundle of documents. Regarding this, according to the first illustrative embodiment, when the skew amount sk1 is increased while reading the bundle of documents, the skew correction using the pre-register rolls 14 is performed from the middle of the bundle of documents. Therefore, it is possible to suppress the reading image quality from being deteriorated, as compared to a configuration where the skew correction is not changed as the skew amount sk1 of the document Gi is changed.

Here, as the skew correction of the document Gi, it is also considered to correct the skew by using the pre-register rolls 14 all the time. However, the skew correction using the pre-register rolls 14 causes a noise when the leading end of the document Gi collides with the pre-register rolls 14. Also, since the document Gi is once stopped by the pre-register rolls 14, the number of documents Gi to be read per unit time is reduced, as compared to a configuration where the document Gi is not stopped.

In contrast, according to the first illustrative embodiment, when the number of sheets to be printed N1 is small, when the amount of documents is small, and when the skew amount sk1 is small, the skew is corrected in the image processing where the sound is silent and the processing speed is fast, and when the skew reading is problematic such as when the number of sheets to be printed N1 is large, when the amount of documents is large and when the skew amount sk1 is large, the skew is corrected using the pre-register rolls 14. Thereby, according to the first illustrative embodiment, it is possible to improve the reading image quality while suppressing the generation of the noise and the lowering of the processing speed to the minimum.

In the meantime, according to the technology of switching the tiling correction method with only the type of the sheet, like Patent Documents 1 and 2, when a user loads a bundle of documents in the document feeding tray, if the documents are messily loaded and an actual skew amount is thus excessively large, it is not possible to cope with the corresponding situation or many sheets may be wasted. Also, according to the technology disclosed in Patent Documents 1 and 2, the correction method is set depending on the type of the sheet and cannot be switched during the reading, so that it is not possible to perform the correction in accordance with the actual document situation.

In contrast, according to the first illustrative embodiment, as described above, the correction method is appropriately set depending on the actual situations of the document Gi such as the set number of sheets to be printed, the amount of documents and the actual skew amount sk1, so that the waste of sheets is also reduced.

Second Illustrative Embodiment

Figure 6:
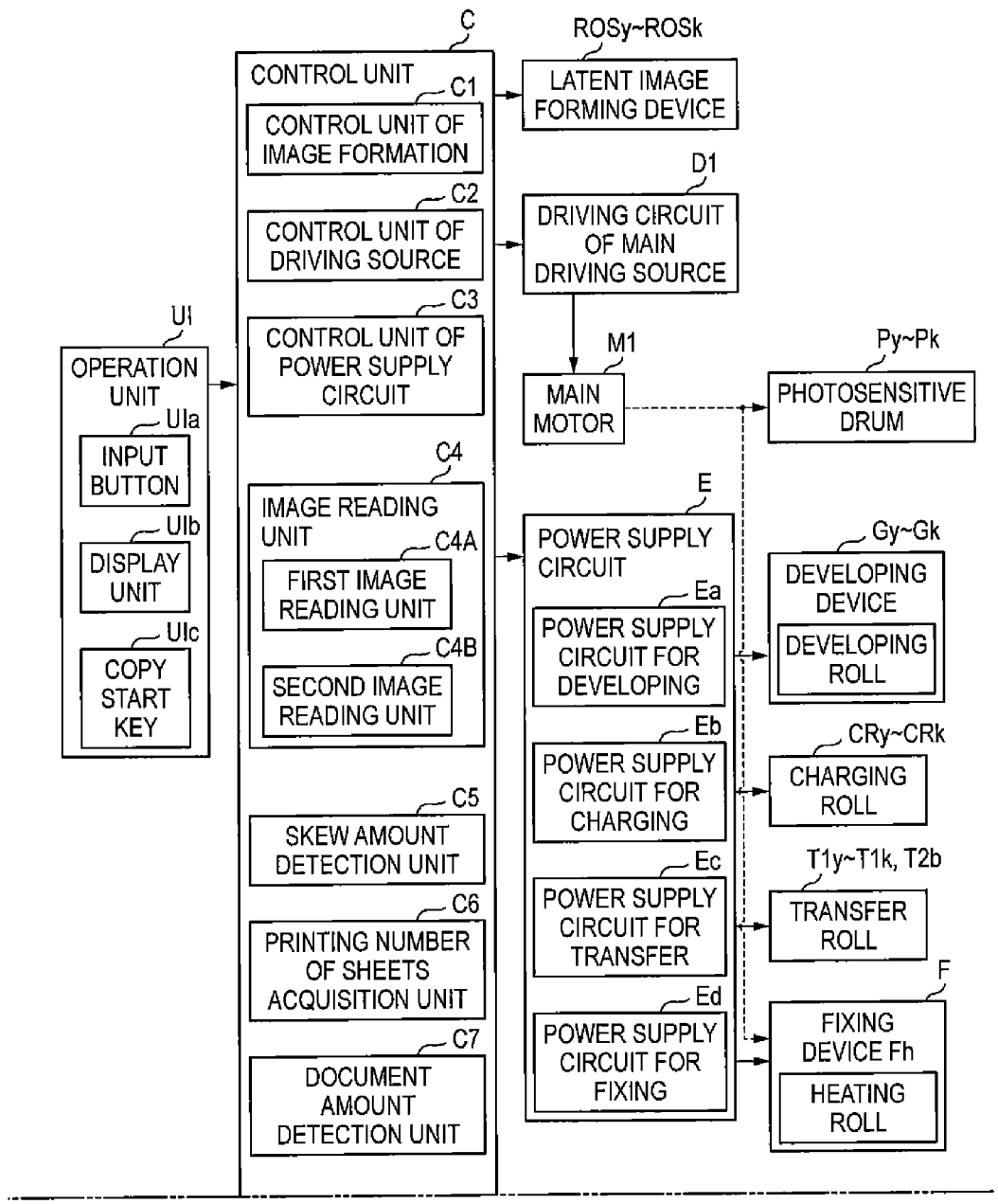
FIG. 6 is a block diagram showing respective functions of a control unit of an image forming apparatus according to a second illustrative embodiment, which corresponds to FIG. 4 of the first illustrative embodiment.

FIG. 6 is a block diagram showing respective functions of the control unit of the image forming apparatus according to a second illustrative embodiment, which corresponds to FIG. 4 of the first illustrative embodiment.

In the below, the second illustrative embodiment of the present invention is described. In the descriptions of the second illustrative embodiment, the constitutional elements corresponding to the constitutional elements of the first illustrative embodiment are denoted with the same reference numerals and the detailed descriptions thereof are omitted.

The second illustrative embodiment is the same as the first illustrative embodiment, except for following points.

In FIG. 6, the control unit C of the copying machine U according to the second illustrative embodiment has a correction execution unit C8', instead of the correction execution unit C8 of the first illustrative embodiment.

Like the first illustrative embodiment, the correction execution unit C8' of the second illustrative embodiment has the skew determination value storage unit C8A, the storage unit C8B of a first value for judging a plurality of numbers and the storage unit C8C of a second value for judging a plurality of numbers. In the second illustrative embodiment, when the skew amount sk1 detected by the skew amount detection unit C5 is larger than the preset skew amount ska, the correction execution unit C8' executes both the correction by the pre-register rolls 14 and the skew correction by the image processing for a next document Gi and thereafter. On the other hand, when the skew amount sk1 detected by the skew amount detection unit C5 is equal to or smaller than the preset skew amount ska, the correction execution unit C8' of the second illustrative embodiment does not execute the correction. Also, when the number of sheets to be printed N1, which is an example of a number of copies of the document Gi, is larger than the first value Na for judging a plurality of numbers, or when the number of sheets to be printed N1 of the document Gi is equal to or smaller than the first value Na for judging a plurality of numbers and is larger than the second value Nb for judging a plurality of numbers and the amount of the documents Gi is larger than the preset amount of documents, the correction execution unit C8' of the second illustrative embodiment executes both the correction by the pre-register rolls 14 and the skew correction by the image processing. On the other hand, when the number of sheets to be printed N1 of the document Gi is equal to or smaller than the second value Nb for judging a plurality of numbers or the amount of the documents Gi is smaller than the preset amount of documents, the correction execution unit C8' of the second illustrative embodiment does not execute the correction.

Figure 7:
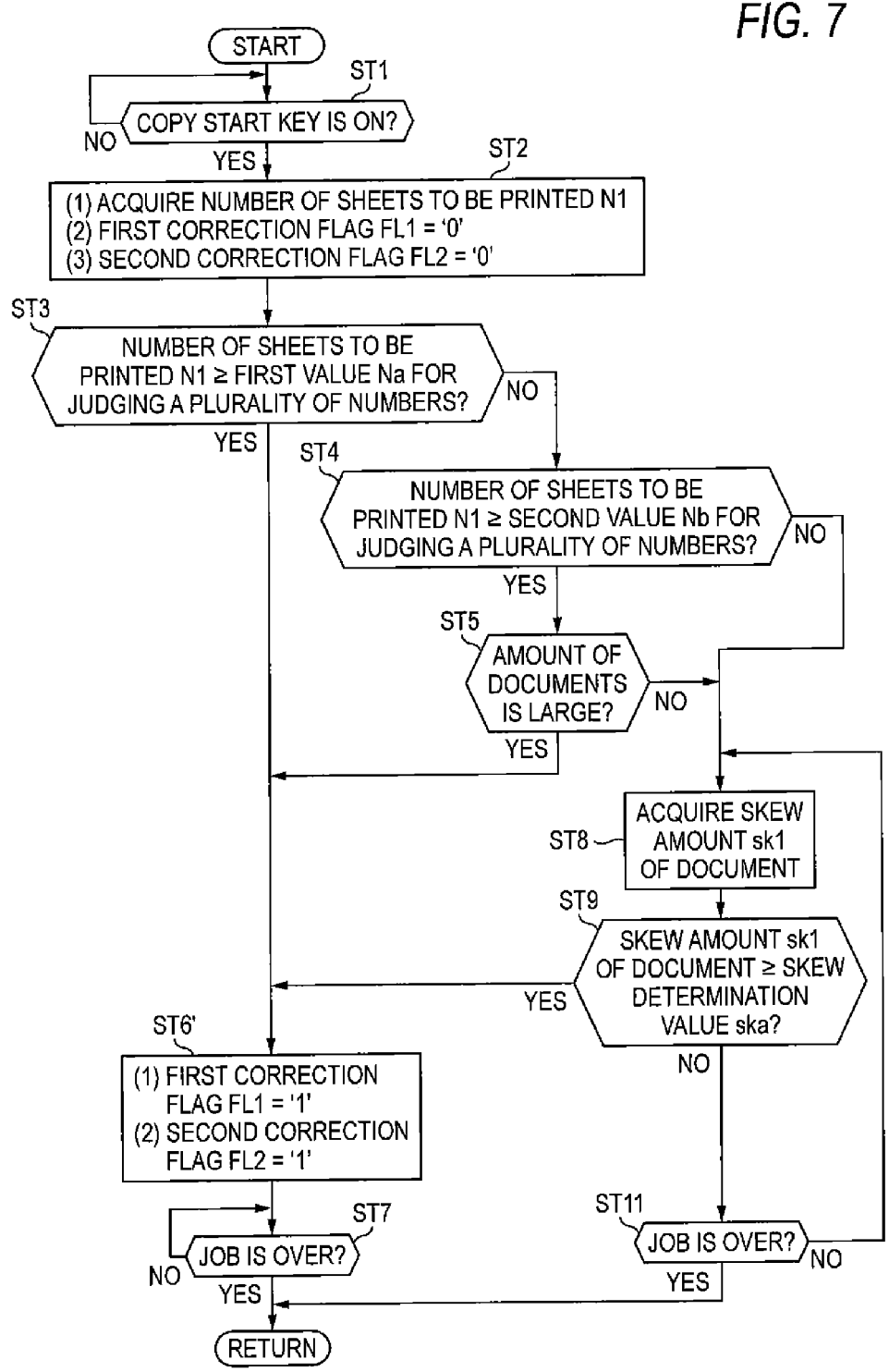
FIG. 7 is a flowchart showing skew correction processing according to the second illustrative embodiment, which corresponds to FIG. 5 of the first illustrative embodiment.

FIG. 7 is a flowchart showing the skew correction processing according to the second illustrative embodiment, which corresponds to FIG. 5 of the first illustrative embodiment.

In FIG. 7, a step ST6' is executed in the skew correction processing of the second illustrative embodiment, instead of step ST6 of the first illustrative embodiment, and the processing of step S10 of the first illustrative embodiment is omitted. The other processing is the same. Therefore, only step ST6' is described and the descriptions of the other steps ST are omitted.

In step ST6', the control unit C executes processing (1) of setting the first correction flag FL1 to '1' and processing (2) of setting the second correction flag FL2 to '1' and then proceeds to step ST7.

Operations of Second Illustrative Embodiment

In the copying machine U of the second illustrative embodiment having the above-described configuration, when correcting the skew, the software correction using the image processing is also performed, in addition to the mechanical correction using the pre-register rolls 14. Thereby, when the skew amount sk1 is large or when the number of sheets to be printed N1 or the amount of documents is large, so that a re-printing has a great influence, the reading precision is improved by both the mechanical correction and the software correction. Also, when the necessity of the correction is small, for example, when the skew amount sk1 is small, the correction is not performed to improve the quietness and high-speed characteristics.

In the meantime, according to the second illustrative embodiment, when the skew amount sk1 is small, any one of the software correction and the mechanical correction may be executed, depending on the specification of the copying machine U or the user's request.

Third Illustrative Embodiment

Figure 8:
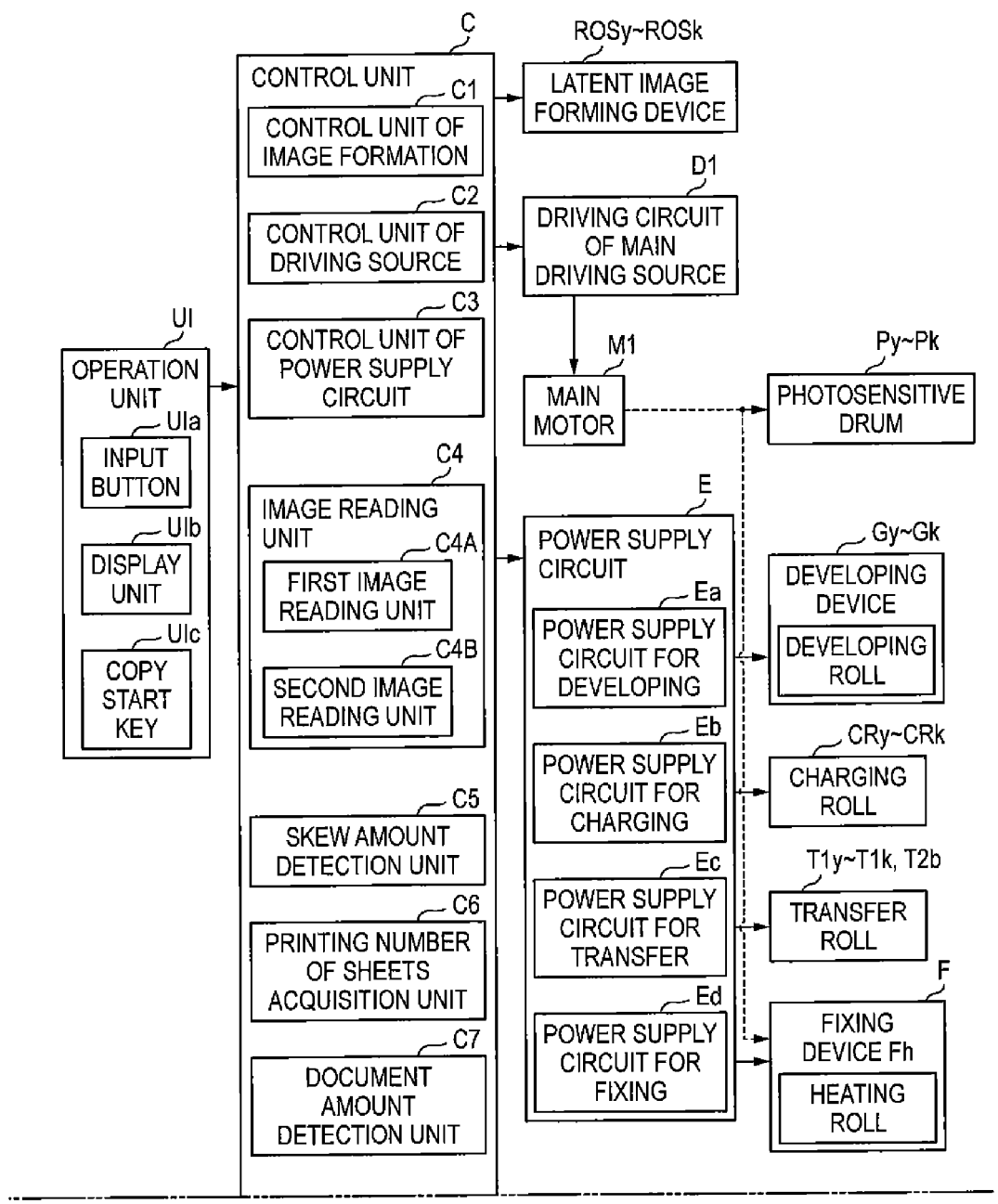
FIG. 8 is a block diagram showing respective functions of a control unit of an image forming apparatus according to a third illustrative embodiment, which corresponds to FIG. 4 of the first illustrative embodiment.

FIG. 8 is a block diagram showing respective functions of the control unit of the image forming apparatus according to a third illustrative embodiment, which corresponds to FIG. 4 of the first illustrative embodiment.

In the below, the third illustrative embodiment of the present invention is described. In the descriptions of the third illustrative embodiment, the constitutional elements corresponding to the constitutional elements of the first illustrative embodiment are denoted with the same reference numerals and the detailed descriptions thereof are omitted.

The third illustrative embodiment is the same as the first illustrative embodiment, except for following points.

In FIG. 8, the control unit C of the copying machine U according to the third illustrative embodiment has a correction execution unit C8", instead of the correction execution unit C8 of the first illustrative embodiment.

Like the first illustrative embodiment, the correction execution unit C8" of the third illustrative embodiment has the skew determination value storage unit C8A, the storage unit C8B of a first value for judging a plurality of numbers and the storage unit C8C of a second value for judging a plurality of numbers. In the third illustrative embodiment, when the skew amount sk1 detected by the skew amount detection unit C5 is larger than the preset skew amount ska, the correction execution unit C8" executes the skew correction by the image processing for a next document Gi and thereafter. On the other hand, when the skew amount sk1 detected by the skew amount detection unit C5 is equal to or smaller than the preset skew amount ska, the correction execution unit C8" of the third illustrative embodiment does not execute the correction. Also, when the number of sheets to be printed N1, which is an example of a number of copies of the document Gi, is larger than the first value Na for judging a plurality of numbers, or when the number of sheets to be printed N1 of the document Gi is equal to or smaller than the first value Na for judging a plurality of numbers and is larger than the second value Nb for judging a plurality of numbers and the amount of the documents Gi is larger than the preset amount of documents, the correction execution unit C8" of the third illustrative embodiment executes the correction by the pre-register rolls 14. On the other hand, when the number of sheets to be printed N1 of the document Gi is equal to or smaller than the second value Nb for judging a plurality of numbers or the amount of the documents Gi is smaller than the preset amount of documents, the correction execution unit C8" of the third illustrative embodiment executes the correction if the skew amount sk1 is large and does not execute the correction if the skew amount sk1 is small.

Figure 9:
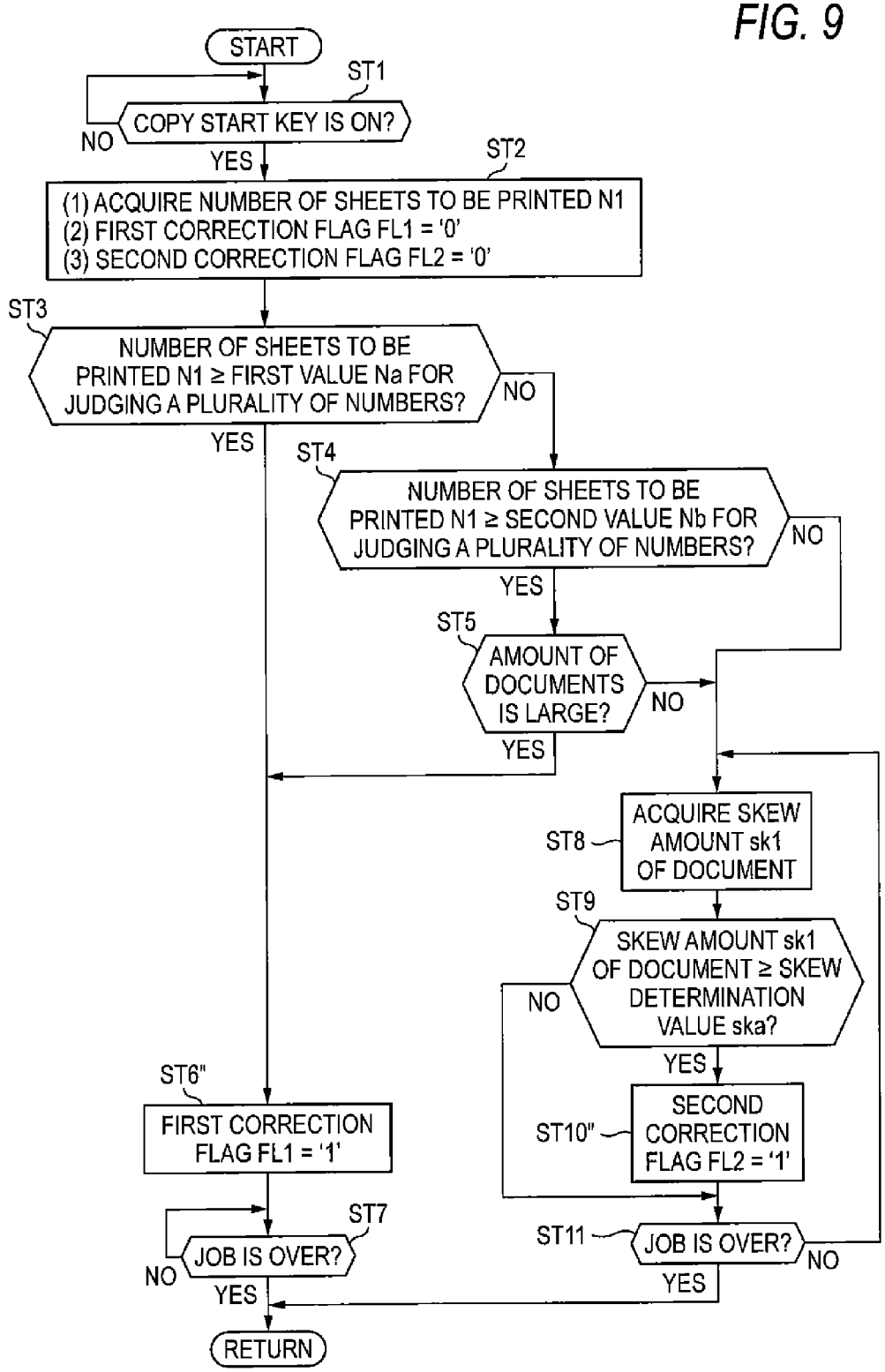
FIG. 9 is a flowchart showing skew correction processing according to the third illustrative embodiment, which corresponds to FIG. 5 of the first illustrative embodiment.

FIG. 9 is a flowchart showing the skew correction processing according to the third illustrative embodiment, which corresponds to FIG. 5 of the first illustrative embodiment.

In FIG. 9, in the skew correction processing of the third illustrative embodiment, a step ST6" is executed instead of step ST6 of the first illustrative embodiment, and when a result of the determination in step ST9 is YES (Y), the control unit C executes step ST10", and when a result of the determination in step ST9 is NO (N), the control unit C proceeds to step ST11. The other processing is the same. Therefore, only steps ST6", ST10" are described and the descriptions of the other steps ST are omitted.

In step ST6", the control unit C sets the first correction flag FL1 to '1' and proceeds to step ST7.

In step ST10", the control unit C sets the second correction flag FL2 to '1' and proceeds to step ST11.

Operations of Third Illustrative Embodiment

In the copying machine U of the third illustrative embodiment having the above-described configuration, when correcting the skew, the different corrections are performed when the skew amount sk1 is large and when the number of sheets to be printed N1 or the amount of documents is large, so that a re-printing has a great influence. Therefore, when a storage medium or memory having a sufficient storage capacity is mounted and it is thus possible to sufficiently cope with the large skew amount sk1 by the software correction, it may be possible to perform the software correction, focusing the quietness, like the third illustrative embodiment. In the meantime, according to the third illustrative embodiment, when the number of sheets to be printed N1 or the amount of documents is large, the software correction may be executed, depending on the specification of the copying machine U or the user's request, and the processing of steps ST6", ST10" may be exchanged with each other.

Fourth Illustrative Embodiment

Figure 10:
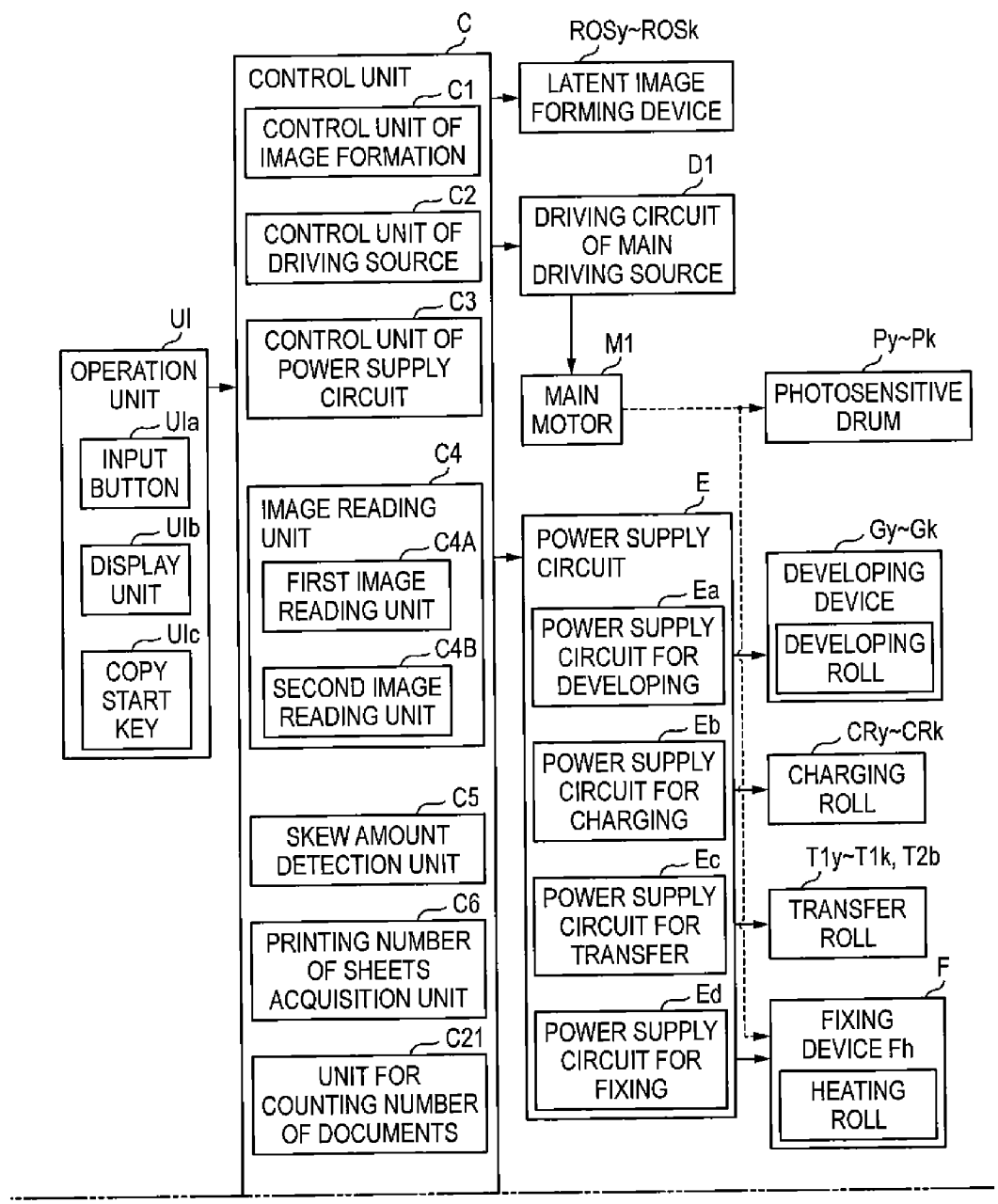
FIG. 10 is a block diagram showing respective functions of a control unit of an image forming apparatus according to a fourth illustrative embodiment, which corresponds to FIG. 4 of the first illustrative embodiment.

FIG. 10 is a block diagram showing respective functions of the control unit of the image forming apparatus according to a fourth illustrative embodiment, which corresponds to FIG. 4 of the first illustrative embodiment.

In the below, the fourth illustrative embodiment of the present invention is described. In the descriptions of the fourth illustrative embodiment, the constitutional elements corresponding to the constitutional elements of the first illustrative embodiment are denoted with the same reference numerals and the detailed descriptions thereof are omitted.

The fourth illustrative embodiment is the same as the first illustrative embodiment, except for following points.

In FIG. 10, the control unit C of the copying machine U according to the fourth illustrative embodiment has a unit C21 for counting a number of documents and a correction execution unit C22, instead of the document amount detection unit C7 and the correction execution unit C8 of the first illustrative embodiment.

The unit C21 for counting a number of documents is configured to count a number of documents Gi N2 read in the reading members CCD, 21.

The correction execution unit C22 of the fourth illustrative embodiment has the same skew determination value storage unit C8A as the first illustrative embodiment, a storage unit C22B of a first value for judging a plurality of numbers, a storage unit C22C of a second value for judging a plurality of numbers and a storage unit C22D of a third value for judging a plurality of numbers.

In the fourth illustrative embodiment, the storage unit C22B of a first value for judging a plurality of numbers and the storage unit C22C of a second value for judging a plurality of numbers are configured to store therein values Na', Nb' for judging a plurality of numbers for determining whether a total number of sheets to be printed is large or not. In the fourth illustrative embodiment, the first value Na' for judging a plurality of numbers is set to 50 [sheets] and the second value Nb' for judging a plurality of numbers is set to 20 [sheets], for example. Also, in the fourth illustrative embodiment, the storage unit C22D of a third value for judging a plurality of numbers is configured to store therein a third value Nc' for judging a plurality of numbers, which is a present number for determining whether the number of documents Gi N2 is large or not. In the fourth illustrative embodiment, the third value Nc' for judging a plurality of numbers is set to 10 [sheets], for example.

The correction execution unit C22 of the fourth illustrative embodiment is configured to execute the correction by the pre-register rolls 14 for a next document Gi and thereafter when the skew amount sk1 detected by the skew amount detection unit C5 is larger than the preset skew amount ska.

On the other hand, the correction execution unit C8 of the first illustrative embodiment is configured to execute the correction by the image rotation processing unit C10 when the skew amount sk1 detected by the skew amount detection unit C5 is equal to or smaller than the preset skew amount ska. Also, the correction execution unit C22 of the fourth illustrative embodiment is configured to execute the correction by the pre-register rolls 14 when a value of (the number of sheets to be printed N1)×(the number of documents N2), which is an example of the number of copies of the document Gi, is larger than the first value Na' for judging a plurality of numbers. Further, the correction execution unit C22 of the fourth illustrative embodiment is configured to execute the correction by the pre-register rolls 14 when the value of (the number of sheets to be printed N1)×(the number of documents N2) is equal to or smaller than the first value Na' for judging a plurality of numbers and is larger than the second value Nb' for judging a plurality of numbers and the number of documents Gi N2 is larger than the third value Nc' for judging a plurality of numbers. On the other hand, when the value of (the number of sheets to be printed N1)×(the number of documents N2) is smaller than the second value Nb' for judging a plurality of numbers or the number of documents Gi N2 is smaller than the third value Nc' for judging a plurality of numbers, the correction execution unit C22 of the fourth illustrative embodiment is configured to execute the correction by the image rotation processing unit C10 if the skew amount sk1 is small.

Figure 11:
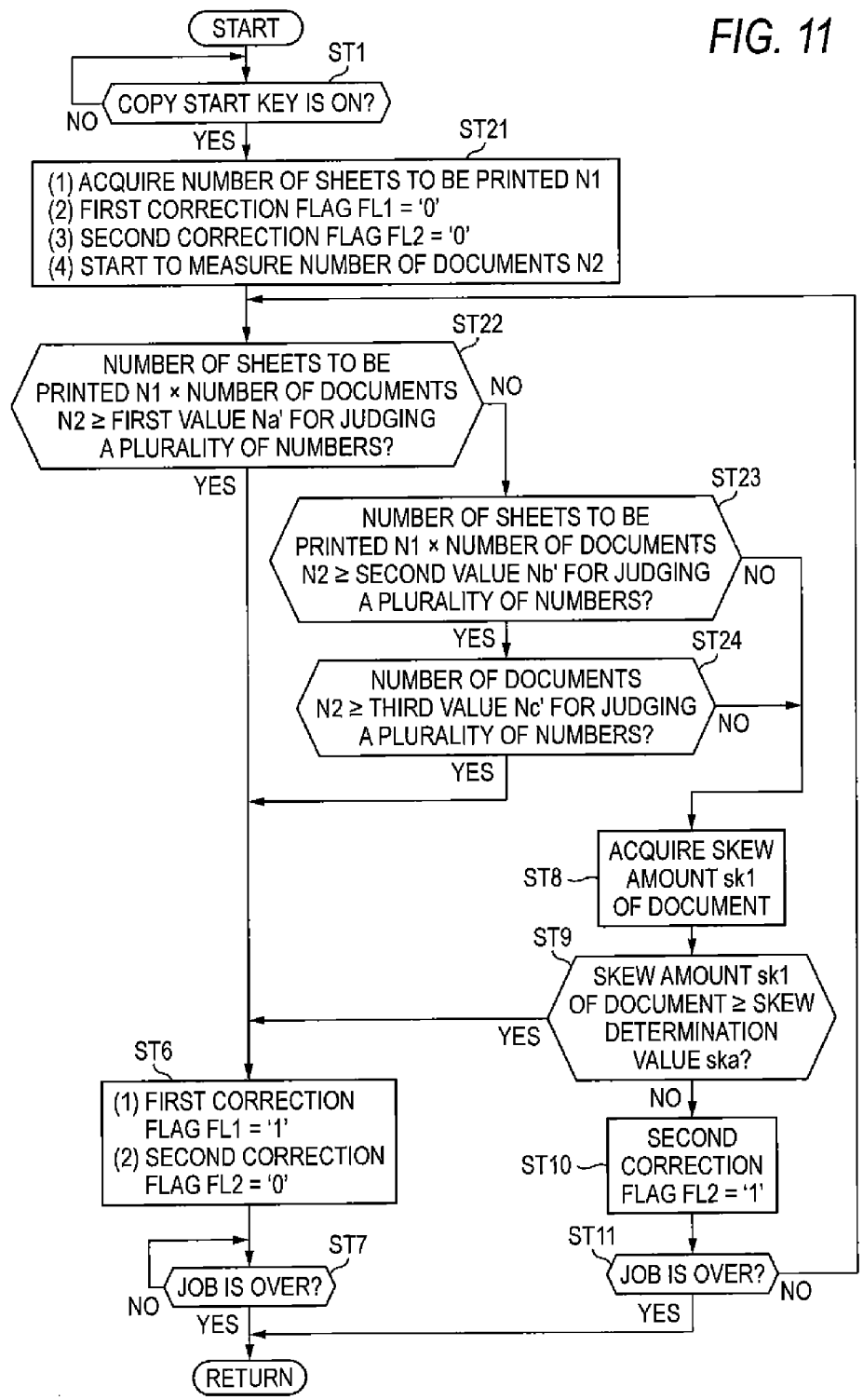
FIG. 11 is a flowchart showing skew correction processing according to the fourth illustrative embodiment, which corresponds to FIG. 5 of the first illustrative embodiment.

FIG. 11 is a flowchart showing the skew correction processing according to the fourth illustrative embodiment, which corresponds to FIG. 5 of the first illustrative embodiment.

In FIG. 11, steps ST21 to ST24 are executed in the skew correction processing of the fourth illustrative embodiment, instead of steps ST2 to ST5 of the first illustrative embodiment. Therefore, only steps ST21 to ST24 are described and the descriptions of the other steps ST are omitted.

In step ST21 of FIG. 11, the control unit C executes processing (1) of acquiring the number of sheets to be printed N1, processing (2) of initializing the first correction flag FL1 to '0', processing (3) of initializing the second correction flag FL2 to '0' and processing (4) of starting to measure the number of documents N2, and then proceeds to step ST22.

In step ST22, the control unit C determines whether the value of (the number of sheets to be printed N1)×(the number of documents N2) is equal to or larger than the first value Na' for judging a plurality of numbers. When a result of the determination is NO (N), the control unit C proceeds to step S23, and when a result thereof is YES (Y), the control unit C proceeds to step ST6.

In step ST23, the control unit C determines whether the value of (the number of sheets to be printed N1)×(the number of documents N2) is equal to or larger than the second value Nb' for judging a plurality of numbers. When a result of the determination is YES (Y), the control unit C proceeds to step S24, and when a result thereof is NO (N), the control unit C proceeds to step ST8.

In step ST24, the control unit C determines whether the value of (the number of sheets to be printed N1)×(the number of documents N2) is equal to or larger than the third value Nc' for judging a plurality of numbers. When a result of the determination is YES (Y), the control unit C proceeds to step S6, and when a result thereof is NO (N), the control unit C proceeds to step ST8.

Operations of Fourth Illustrative Embodiment

In the copying machine U of the fourth illustrative embodiment having the above-described configuration, when starting the reading operation, i.e., when the number of documents N2 is small, the correction using the pre-register rolls 14 is not executed if the skew amount sk1 is small. As the reading operation progresses, when the number of documents N2 is increased and the value of (the number of sheets to be printed N1)×(the number of documents N2) is thus equal to or larger than the first value Na' for judging a plurality of numbers or is equal to or larger than the second value Nb' for judging a plurality of numbers and the number of documents N2 is equal to or larger than the third value Nc' for judging a plurality of numbers, the correction using the pre-register rolls 14 is executed as regards the reading operation of a next document Gi and thereafter. Therefore, depending on the amount of the documents Gi, when the total number of sheets to be printed is increased and thus a re-printing has a great influence, the correction is performed, and when the influence is not high, the correction is not performed. Thereby, the appropriate correction operation is performed depending on the situation. In addition, the fourth illustrative embodiment has the same operational effects as the first illustrative embodiment.

Fifth Illustrative Embodiment

Figure 12:
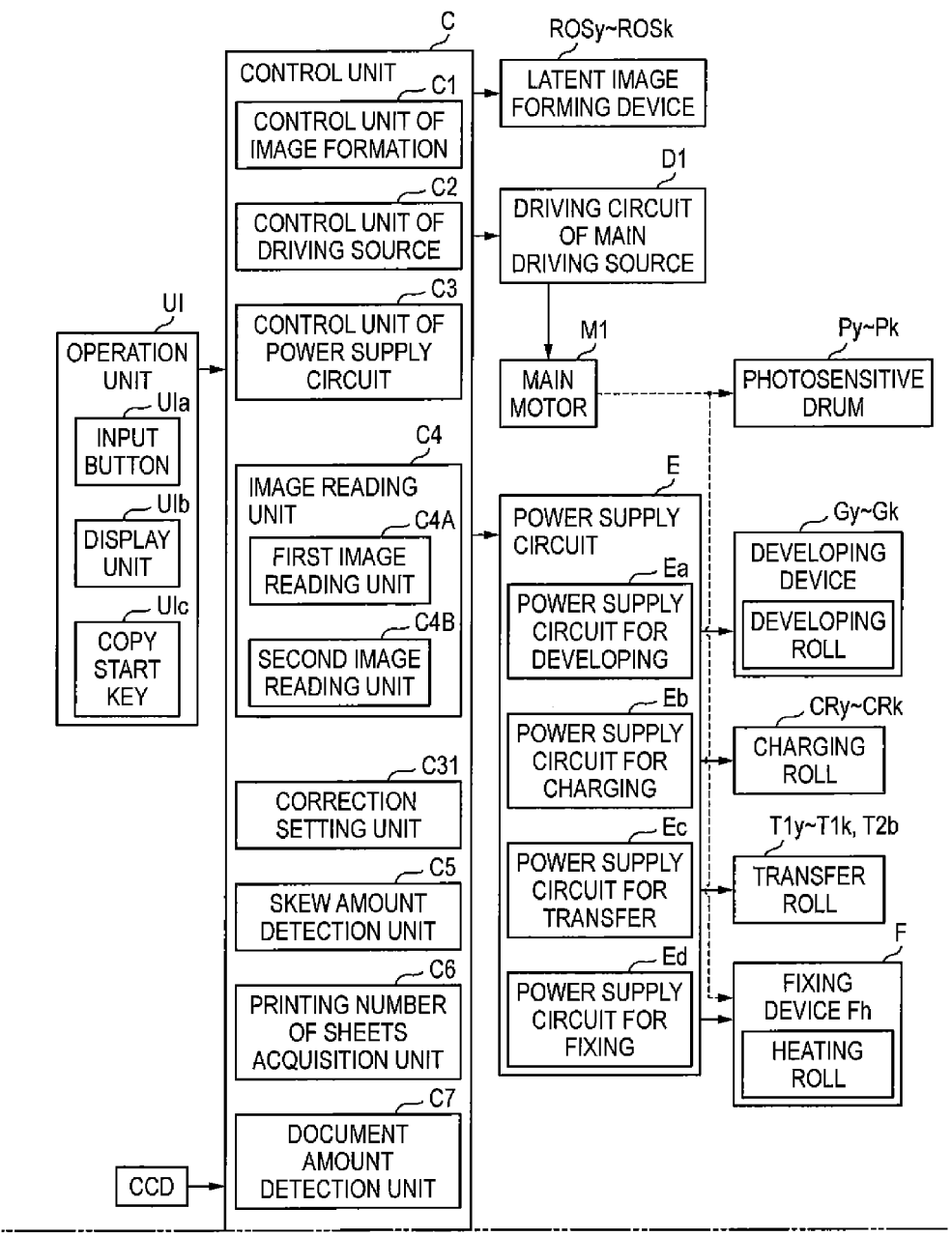
FIG. 12 is a block diagram showing respective functions of a control unit of an image forming apparatus according to a fifth illustrative embodiment, which corresponds to FIG. 4 of the first illustrative embodiment.

FIG. 12 is a block diagram showing respective functions of the control unit of the image forming apparatus according to a fifth illustrative embodiment, which corresponds to FIG. 4 of the first illustrative embodiment.

In the below, the fifth illustrative embodiment of the present invention is described. In the descriptions of the fifth illustrative embodiment, the constitutional elements corresponding to the constitutional elements of the first illustrative embodiment are denoted with the same reference numerals and the detailed descriptions thereof are omitted.

The fifth illustrative embodiment is the same as the first illustrative embodiment, except for following points.

In FIG. 12, the control unit C of the copying machine U according to the fifth illustrative embodiment has a correction setting unit C31. The correction setting unit C31 of the fifth illustrative embodiment is configured to set whether to perform the mechanical correction using the pre-register rolls 14 or the software correction executed by the image rotation processing unit C10, depending on an input from the input button UIa. The correction setting unit C31 of the fifth illustrative embodiment is configured to set any one of the mechanical correction, the software correction and no execution of the correction, depending on the input from the input button UIa. Meanwhile, in the fifth illustrative embodiment, when the mechanical correction or software correction is set from the input button UIa, the input setting is preferentially performed. When no execution of the correction is set, it is determined whether or not to perform the correction on the basis of the number of sheets to be printed N1 or skew amount sk1, like the first illustrative embodiment.

Figure 13:
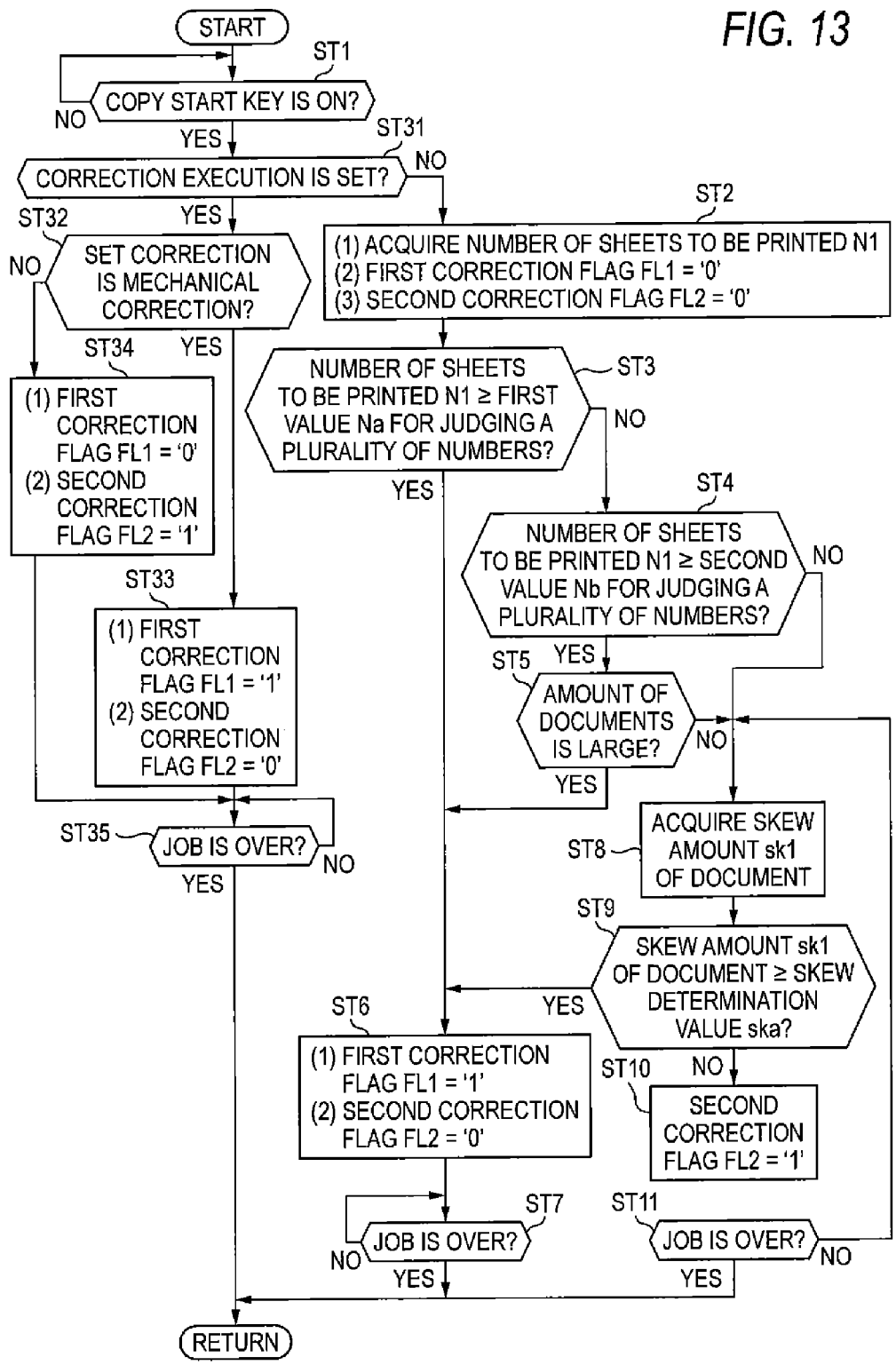
FIG. 13 is a flowchart showing skew correction processing according to the fifth illustrative embodiment, which corresponds to FIG. 5 of the first illustrative embodiment.

FIG. 13 is a flowchart showing the skew correction processing according to the fifth illustrative embodiment, which corresponds to FIG. 5 of the first illustrative embodiment.

In FIG. 13, in the skew correction processing of the fifth illustrative embodiment, steps ST31 to ST35 are executed between steps ST1 and ST2 of the first illustrative embodiment. Therefore, only steps ST31 to ST35 are described and the descriptions of the other steps ST are omitted.

In step ST31 of FIG. 13, the control unit C determines whether a correction execution setting is made. When a result of the determination is YES (Y), the control unit C proceeds to step S32, and when a result thereof is NO (N), the control unit C proceeds to step ST2.

In step ST32, the control unit C determines whether the set correction is the mechanical correction or not. When a result of the determination is YES (Y), the control unit C proceeds to step S33, and when a result thereof is NO (N), the control unit C proceeds to step ST34.

In step ST33, the control unit C executes processing (1) of setting the first correction flag FL1 to '1' and processing (2) of setting the second correction flag FL2 to '0', and then proceeds to step ST35.

In step ST34, the control unit C executes processing (1) of setting the first correction flag FL1 to '0' and processing (2) of setting the second correction flag FL2 to '1', and then proceeds to step ST35.

In step ST35, the control unit C determines whether the job is over. When a result of the determination is NO (N), the control unit C repeats step S35, and when a result thereof is YES (Y), the control unit C returns to step ST1.

Operations of Fifth Illustrative Embodiment

In the copying machine U of the fifth illustrative embodiment having the above-described configuration, when the mechanical correction or software correction is set from the input button UIa, the input correction is executed. When no execution of the correction is set, it is determined whether to execute the correction on the basis of the number of sheets to be printed N1 or skew amount sk1 and then the correction is executed. Therefore, according to the fifth illustrative embodiment, the correction set by the user is preferentially executed, and even when the user does not set the correction, if the correction should be executed due to the number of sheets to be printed N1 or skew amount sk1, the correction is executed. Thus, when the user sets the software correction, focusing on the quietness, the software correction is executed. Also, when the user sets the mechanical correction, focusing on the productivity, rather than the quietness, the mechanical correction is executed. Also, when the user wants the correction setting to be automatically changed depending on the skew amount sk1 and the like, the correction is automatically executed. Thereby, it is possible to cope with the user's requests.

Sixth Illustrative Embodiment

Figure 14:
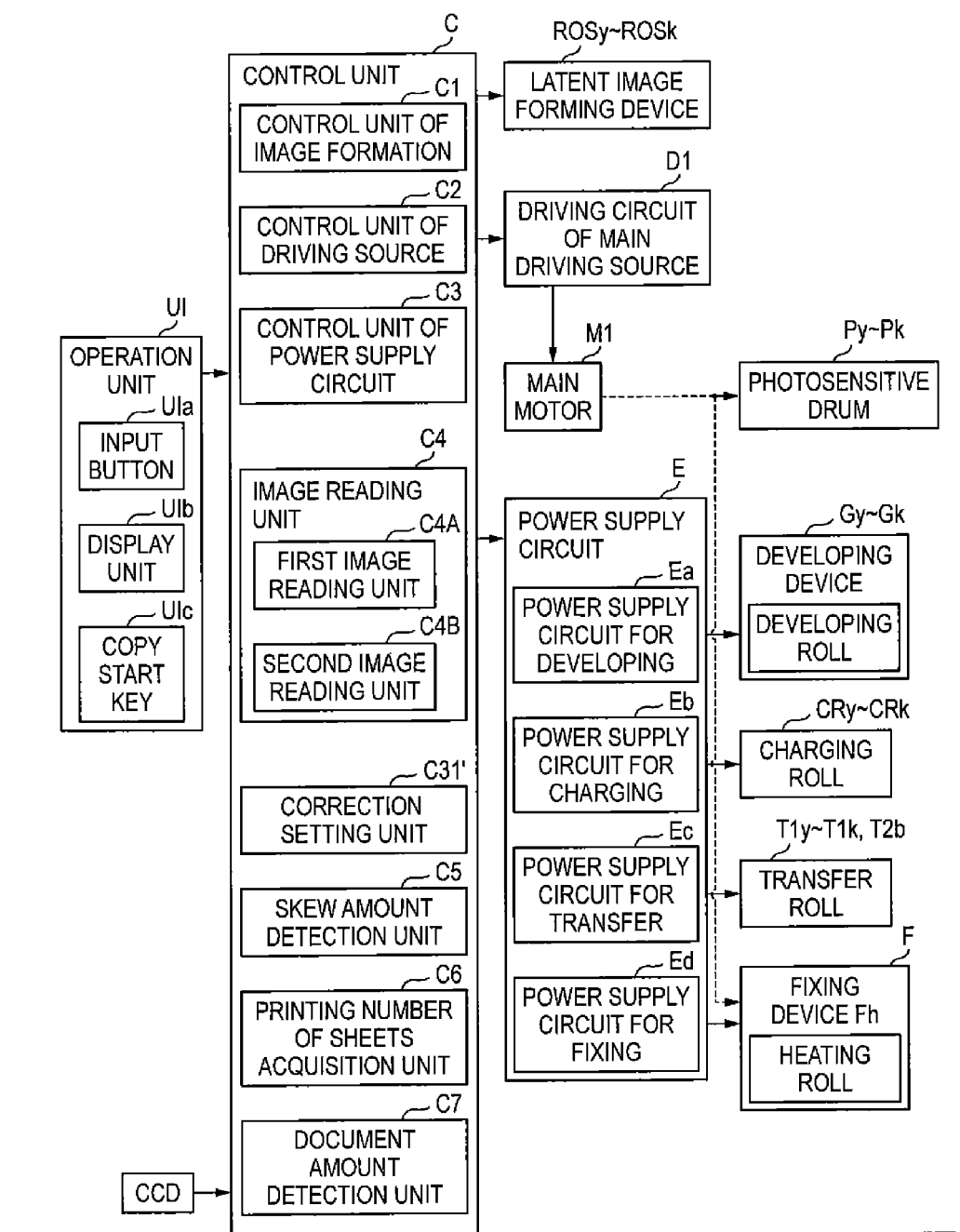
FIG. 14 is a block diagram showing respective functions of a control unit of an image forming apparatus according to a sixth illustrative embodiment, which corresponds to FIG. 4 of the first illustrative embodiment.

FIG. 14 is a block diagram showing respective functions of the control unit of the image forming apparatus according to a sixth illustrative embodiment, which corresponds to FIG. 4 of the first illustrative embodiment.

In the below, the sixth illustrative embodiment of the present invention is described. In the descriptions of the sixth illustrative embodiment, the constitutional elements corresponding to the constitutional elements of the first and fifth illustrative embodiments are denoted with the same reference numerals and the detailed descriptions thereof are omitted.

The sixth illustrative embodiment is the same as the first and fifth illustrative embodiments, except for following points.

In FIG. 14, the control unit C of the copying machine U according to the sixth illustrative embodiment has a correction setting unit C31', instead of the correction setting unit C31 of the fifth illustrative embodiment. The correction setting unit C31' of the sixth illustrative embodiment is configured to set whether to perform the mechanical correction using the pre-register rolls 14 or the software correction executed by the image rotation processing unit C10, depending on an input from the input button UIa, like the correction setting unit C31 of the fifth illustrative embodiment. When the mechanical correction is set from the input button UIa, the correction setting unit C31' of the sixth illustrative embodiment is configured to preferentially execute the input setting. When no execution of the correction is set, it is determined whether or not to execute the correction on the basis of the number of sheets to be printed N1 or skew amount sk1. When the software correction is set, the correction setting unit C31' of the sixth illustrative embodiment is configured to execute the software correction, and to switch the software correction to the mechanical correction if it is determined that the number of sheets to be printed is large or the skew amount sk1 is large, on the basis of the number of sheets to be printed N1 or skew amount sk1.

Figure 15:
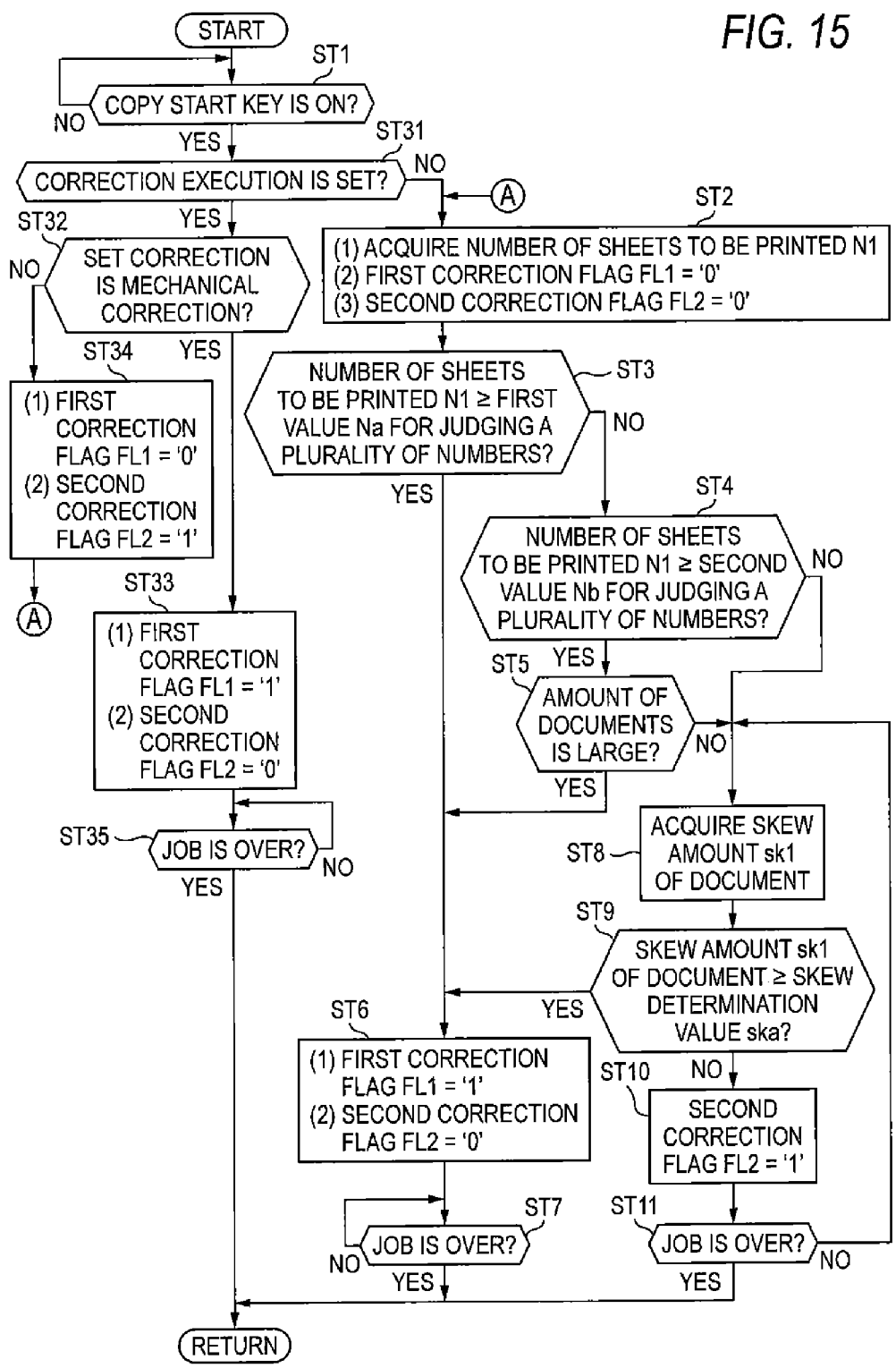
FIG. 15 is a flowchart showing skew correction processing according to the sixth illustrative embodiment, which corresponds to FIG. 13 of the fifth illustrative embodiment.

FIG. 15 is a flowchart showing the skew correction processing according to the sixth illustrative embodiment, which corresponds to FIG. 13 of the fifth illustrative embodiment.

In FIG. 15, the skew correction processing of the sixth illustrative embodiment is different from the skew correction processing of the fifth illustrative embodiment, in that the control unit C executes the processing (1) and (2) in step ST34 and then proceeds to step ST2. The other processing is the same. Therefore, the descriptions of the respective steps ST are omitted.

Operations of Sixth Illustrative Embodiment

In the copying machine U of the sixth illustrative embodiment having the above-described configuration, when the mechanical correction is set from the input button UIa, the input correction is executed. When the software correction is set, the software correction is first executed but can be switched to the mechanical correction when it is determined that the mechanical correction is more appropriate, depending on the number of sheets to be printed N1 or skew amount sk1. Therefore, according to the sixth illustrative embodiment, even when the user sets the correction, it is possible to automatically switch the set correction method to the more appropriate correction method, depending on the conditions. Hence, it is possible to perform the more appropriate correction operation, as compared to a configuration where the correction method cannot be switched.

Seventh Illustrative Embodiment

Figure 16:
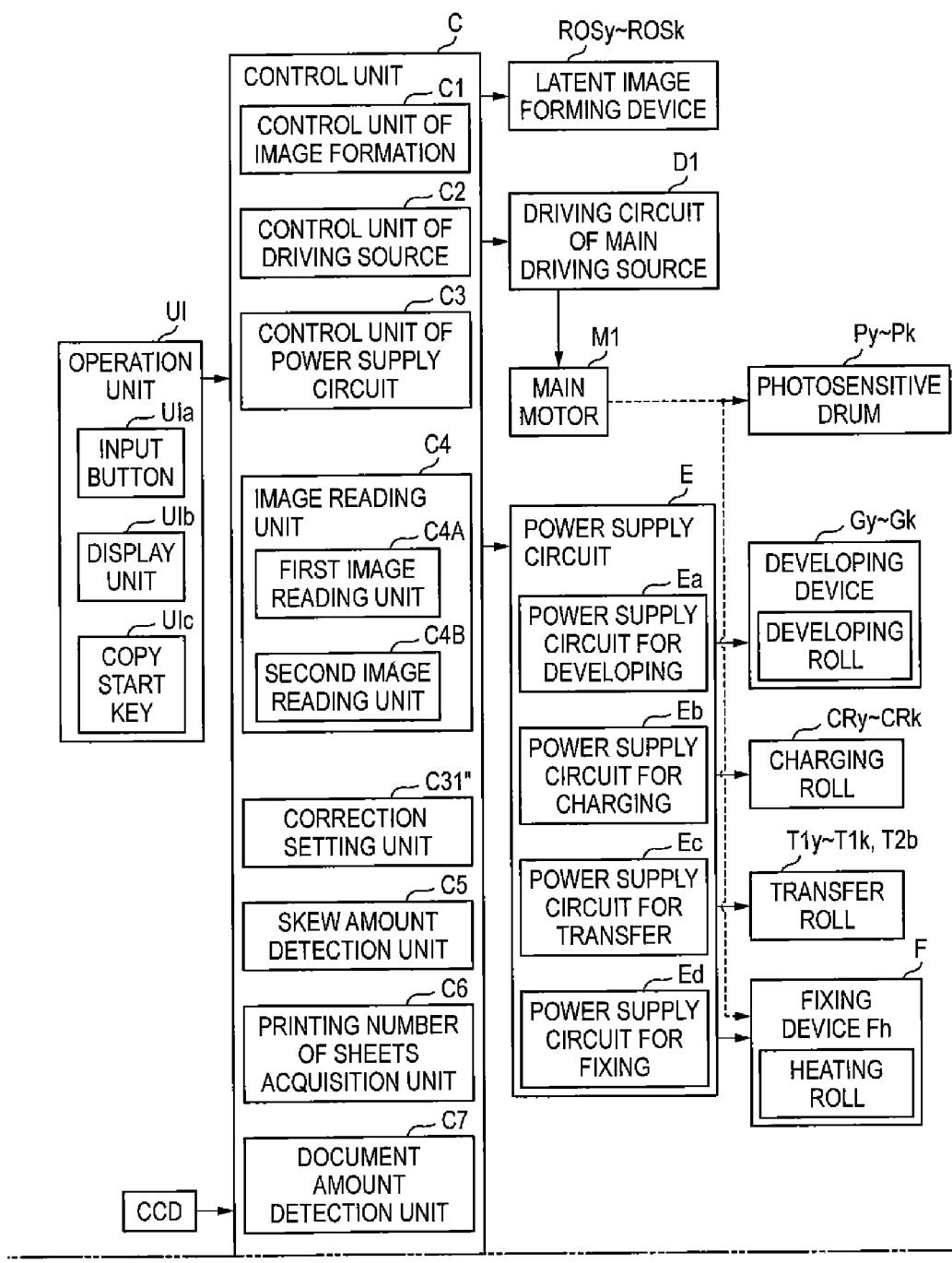
FIG. 16 is a block diagram showing respective functions of a control unit of an image forming apparatus according to a seventh illustrative embodiment, which corresponds to FIG. 4 of the first illustrative embodiment.

FIG. 16 is a block diagram showing respective functions of the control unit of the image forming apparatus according to a seventh illustrative embodiment, which corresponds to FIG. 4 of the first illustrative embodiment.

In the below, the seventh illustrative embodiment of the present invention is described. In the descriptions of the seventh illustrative embodiment, the constitutional elements corresponding to the constitutional elements of the first, second and fifth illustrative embodiments are denoted with the same reference numerals and the detailed descriptions thereof are omitted.

The seventh illustrative embodiment is the same as the first, second and fifth illustrative embodiments, except for following points.

In FIG. 16, the control unit C of the copying machine U according to the seventh illustrative embodiment has a correction setting unit C31", instead of the correction setting unit C31 of the fifth illustrative embodiment. The correction setting unit C31" of the seventh illustrative embodiment is configured to set whether to perform the mechanical correction using the pre-register rolls 14 or the software correction executed by the image rotation processing unit C10, depending on an input from the input button UIa, like the correction setting unit C31 of the fifth illustrative embodiment. When the software correction is set from the input button UIa, the correction setting unit C31" of the seventh illustrative embodiment is configured to preferentially execute the input setting. When no execution of the correction is set, it is determined whether or not to execute the correction on the basis of the number of sheets to be printed N1 or skew amount sk1. When the mechanical correction is set, the correction setting unit C31" of the seventh illustrative embodiment is configured to execute the mechanical correction, and to switch the correction method so that the software correction is also executed in addition to the mechanical correction, if it is determined that the number of sheets to be printed is large or the skew amount sk1 is large, on the basis of the number of sheets to be printed N1 or skew amount sk1.

Figure 17:
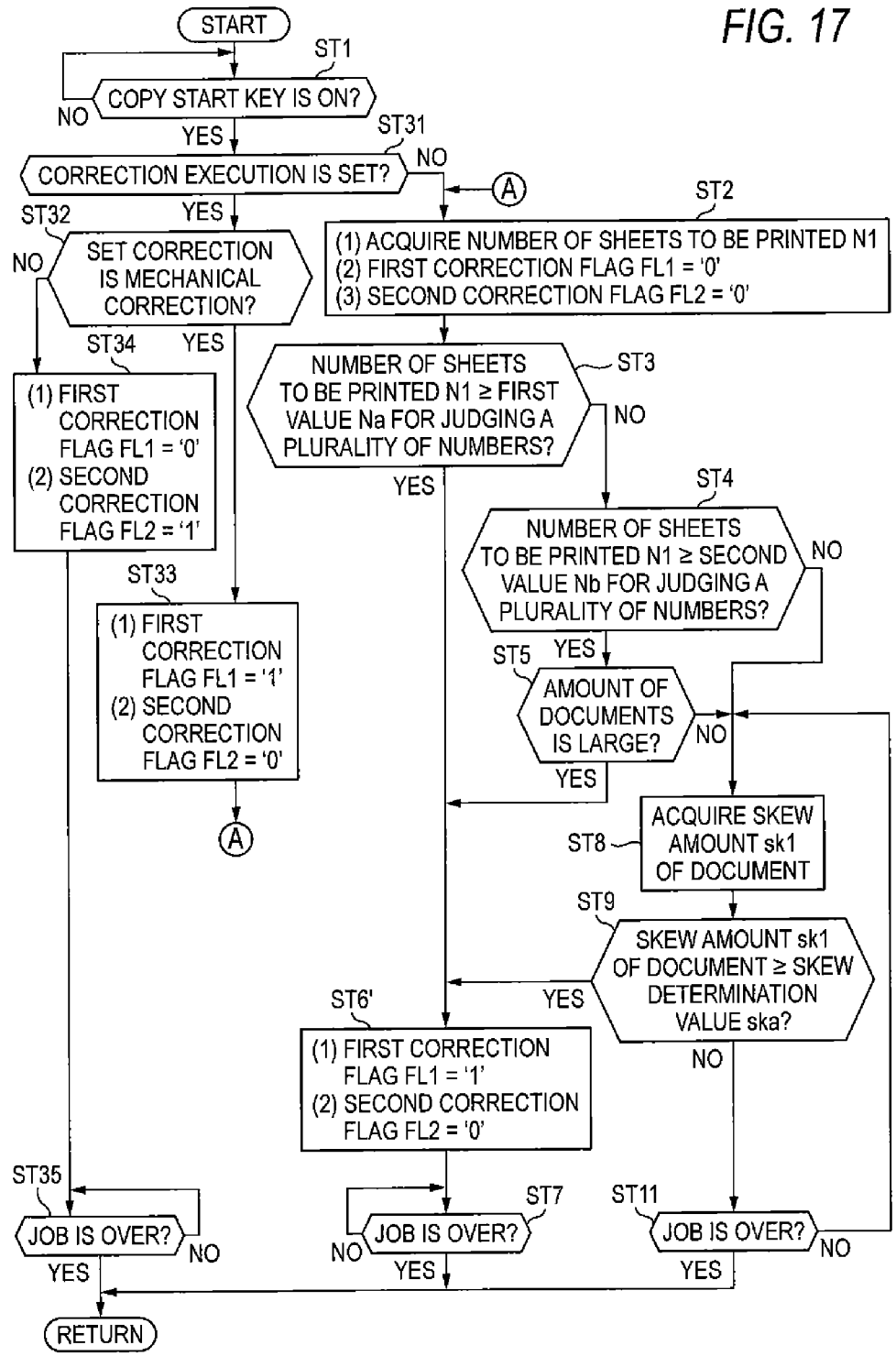
FIG. 17 is a flowchart showing skew correction processing according to the seventh illustrative embodiment, which corresponds to FIG. 7 of the second illustrative embodiment.

FIG. 17 is a flowchart showing the skew correction processing according to the seventh illustrative embodiment, which corresponds to FIG. 7 of the second illustrative embodiment.

In FIG. 17, the skew correction processing of the seventh illustrative embodiment is different from the skew correction processing of the second illustrative embodiment, in that the control unit C executes steps ST31 to ST35 of the fifth illustrative embodiment between steps ST1 and ST2, executes the processing (1) and (2) in step ST33 and then proceeds to step ST2. The other processing is the same. Therefore, the descriptions of the respective steps ST are omitted so as to simplify the descriptions.

Operations of Seventh Illustrative Embodiment

In the copying machine U of the seventh illustrative embodiment having the above-described configuration, when the mechanical correction or software correction is set from the input button UIa, the input correction is executed, like the fifth and sixth illustrative embodiments. In the seventh illustrative embodiment, even when the mechanical correction is set, if it is determined that it is preferable to execute the software correction in addition to the mechanical correction, due to the skew amount sk1 and the like, the software correction is also automatically executed. Therefore, according to the seventh illustrative embodiment, it is possible to execute the appropriate correction operation, depending on the situations.

Eighth Illustrative Embodiment

Figure 18:
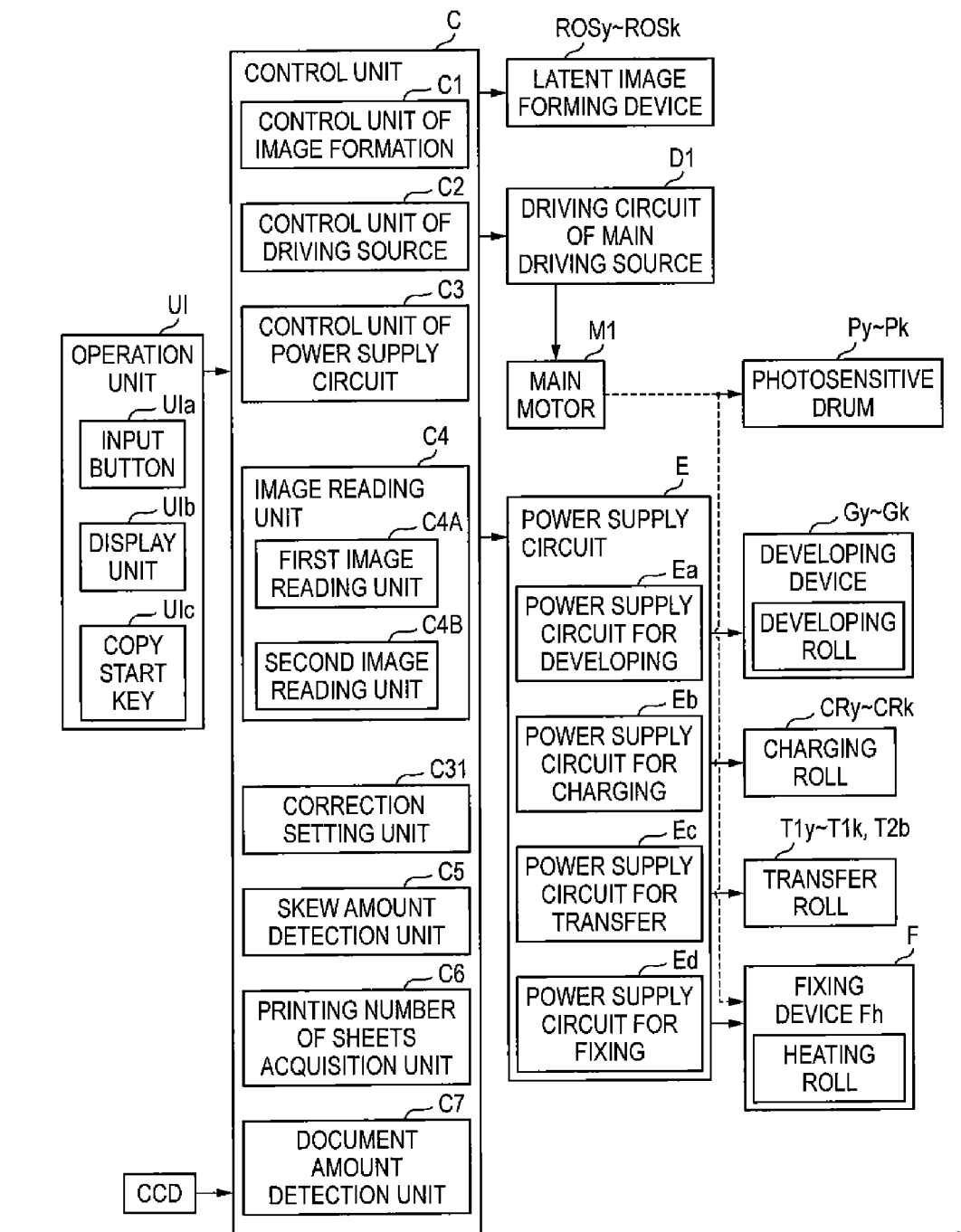
FIG. 18 is a block diagram showing respective functions of a control unit of an image forming apparatus according to an eighth illustrative embodiment, which corresponds to FIG. 12 of the fifth illustrative embodiment.

FIG. 18 is a block diagram showing respective functions of the control unit of the image forming apparatus according to an eighth illustrative embodiment, which corresponds to FIG. 12 of the fifth illustrative embodiment.

In the below, the eighth illustrative embodiment of the present invention is described. In the descriptions of the eighth illustrative embodiment, the constitutional elements corresponding to the constitutional elements of the first and fifth illustrative embodiments are denoted with the same reference numerals and the detailed descriptions thereof are omitted.

The eighth illustrative embodiment is the same as the first and fifth illustrative embodiments, except for following points.

In FIG. 18, the control unit C of the copying machine U according to the eighth illustrative embodiment has a correction execution unit C32, instead of the correction execution unit C8 of the first and fifth illustrative embodiments. The correction execution unit C32 of the eighth illustrative embodiment is configured to execute the operation of correcting the skew of the document Gi, like the correction execution unit C8 of the first and fifth illustrative embodiments. The correction execution unit C32 of the eighth illustrative embodiment is the same as the correction execution unit C8 of the first and fifth illustrative embodiments, except that it is determined only for a first sheet of the bundle of the documents Gi whether the skew amount sk1 detected by the skew amount detection unit C5 is larger than the preset skew amount ska.

Figure 19:
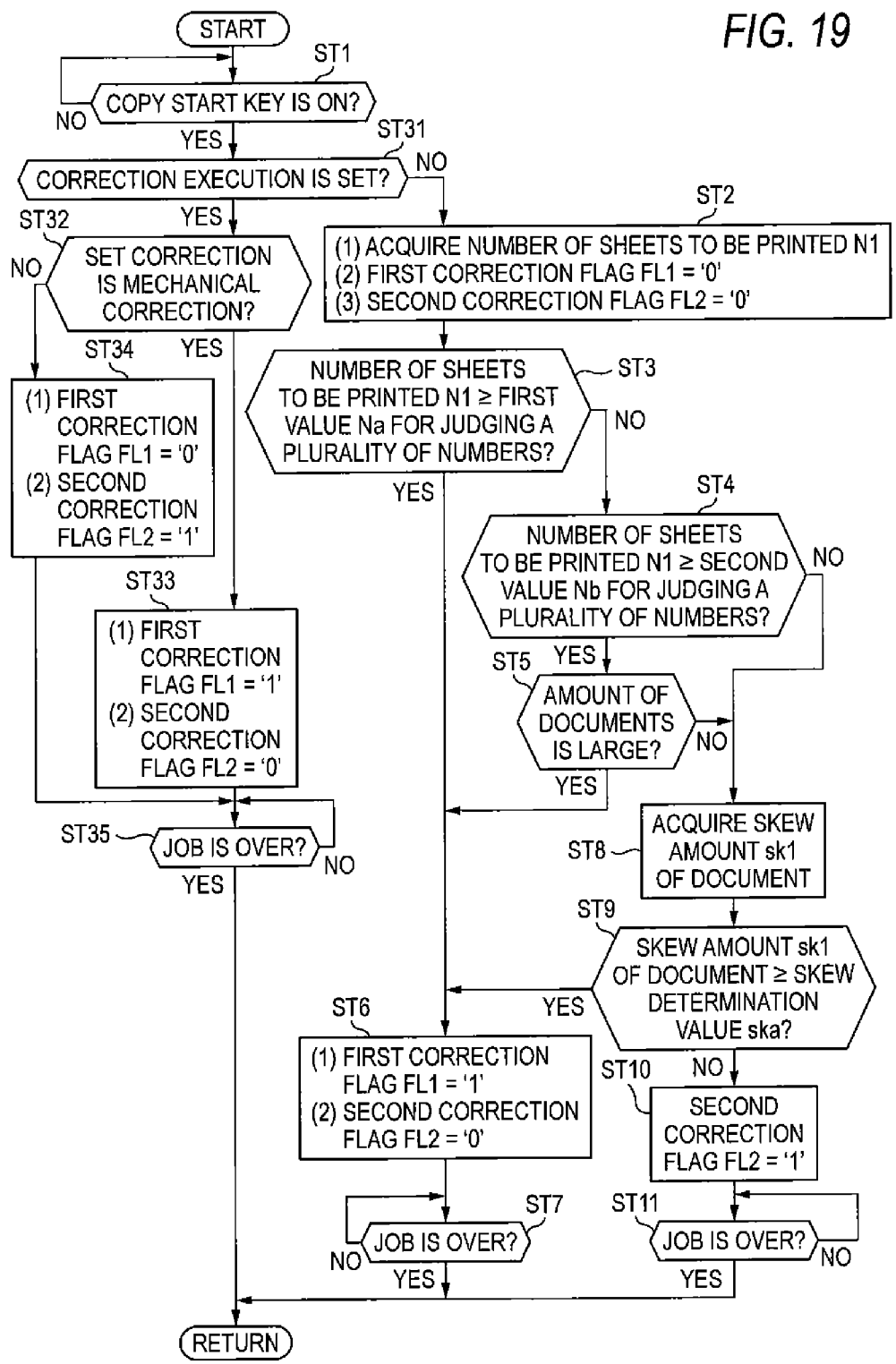
FIG. 19 is a flowchart showing skew correction processing according to the eighth illustrative embodiment, which corresponds to FIG. 13 of the fifth illustrative embodiment.

FIG. 19 is a flowchart showing the skew correction processing according to the eighth illustrative embodiment, which corresponds to FIG. 13 of the fifth illustrative embodiment.

In FIG. 19, the skew correction processing of the eighth illustrative embodiment is different from the skew correction processing of the fifth illustrative embodiment, in that the control unit C repeats step ST11 of the fifth illustrative embodiment when a result of the determination in step ST11 is NO (N). The other processing is the same. Therefore, the descriptions of the other steps ST are omitted so as to simplify the descriptions.

Operations of Eighth Illustrative Embodiment

In the copying machine U of the eighth illustrative embodiment having the above-described configuration, the processing of determining whether the correction operation is executed on the basis of the skew amount sk1 is executed only for a first sheet of the bundle of the documents Gi and the determination is not made for the bundle of documents Gi thereafter.

The specific skew amount sk1 is different for each one of the documents Gi. However, there is a tendency that when the first document Gi is skewed, the following documents are also skewed in many cases, and when the first document Gi is not skewed, the following sheets are also not skewed in many cases. That is, although the skews are different depending on the thickness of the documents Gi, when the documents Gi are aligned, when the documents Gi are aligned at side ends thereof in the document feeding tray U1a1, when the documents Gi are placed by colliding the front ends thereof with the tray, and the like, the placing method, the thickness and the like are common as regards the one bundle of documents Gi in many cases. Therefore, when a skew occurs, the skew occurs from the first sheet, in many cases.

Also, there are a variety of methods of detecting the skew amount sk1 of the document Gi with respect to the conveying direction. However, for example, according to a method of detecting the skew amount sk1 through a calculation from the image information of a leading end of the document Gi, since the detection requires much time and the memory is used during the calculation, the processing for a next document Gi is correspondingly delayed. Also, the processing is more complicated when there is a possibility that the correction will be executed by the correction execution unit C32, as compared to a case where there is no execution possibility. Therefore, if the processing of determining whether or not to execute the correction is performed for all the documents Gi, a demerit may be caused.

In contrast, according to the eighth illustrative embodiment, it is determined whether or not to execute the correction on the basis of the detection of the skew amount sk1 of the first sheet, which is an example of a predetermined number of sheets, and the skew amounts of the documents Gi thereafter are not detected.

Meanwhile, in the eighth illustrative embodiment, the skew amount sk1 is not detected for the second sheet and thereafter. However, the present invention is not limited thereto. For example, a configuration may be possible in which the detection of the skew amount is made but it is not determined whether the skew amount is equal to or larger than a predetermined value ska or it is not switched whether or not to execute the correction even though it is determined that the skew amount is equal to or larger than a predetermined value ska.

Ninth Illustrative Embodiment

Figure 20:
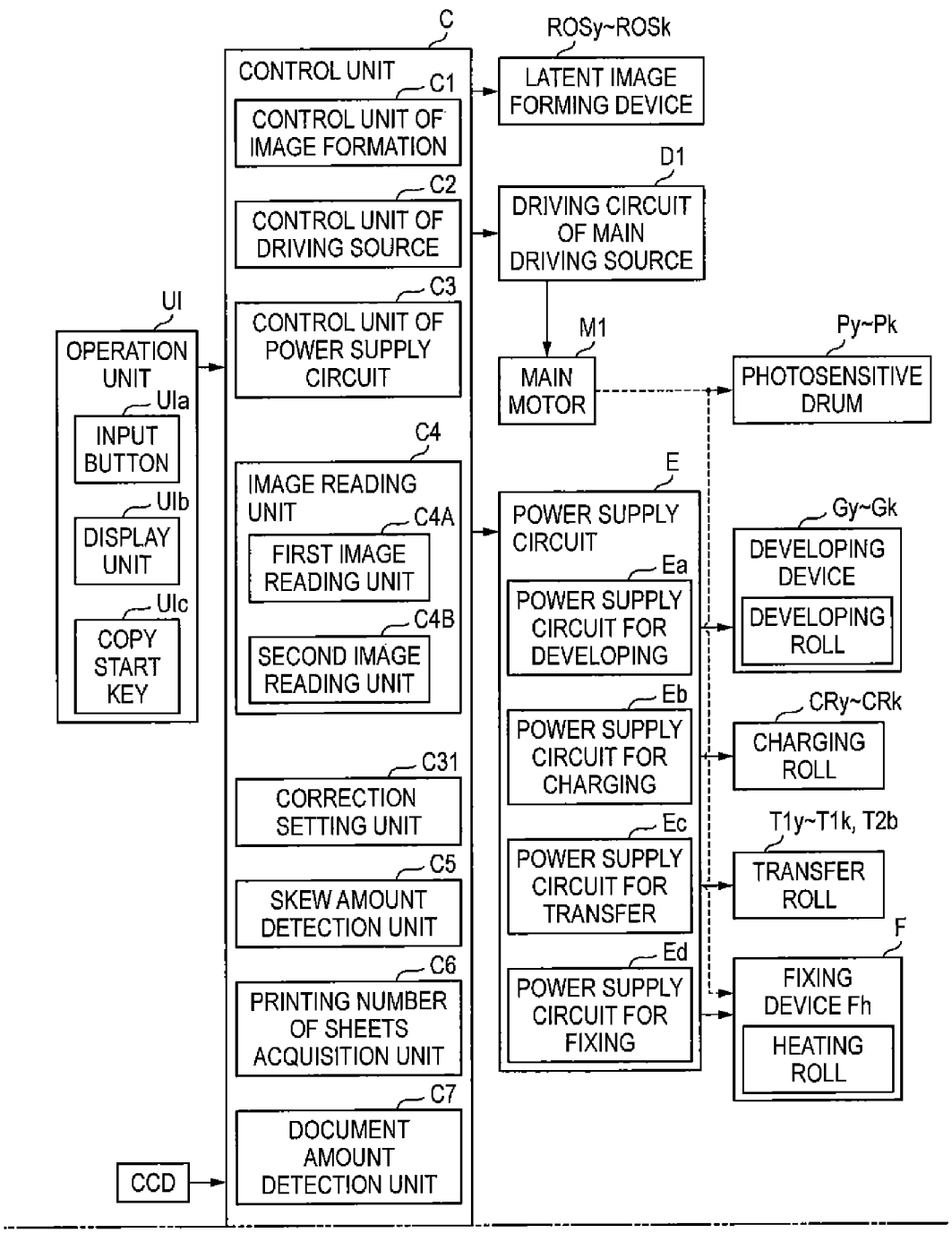
FIG. 20 is a block diagram showing respective functions of a control unit of an image forming apparatus according to a ninth illustrative embodiment, which corresponds to FIG. 12 of the fifth illustrative embodiment.

FIG. 20 is a block diagram showing respective functions of the control unit of the image forming apparatus according to a ninth illustrative embodiment, which corresponds to FIG. 12 of the fifth illustrative embodiment.

In the below, the ninth illustrative embodiment of the present invention is described. In the descriptions of the ninth illustrative embodiment, the constitutional elements corresponding to the constitutional elements of the first and fifth illustrative embodiments are denoted with the same reference numerals and the detailed descriptions thereof are omitted.

The ninth illustrative embodiment is the same as the first and fifth illustrative embodiments, except for following points.

In FIG. 20, the control unit C of the copying machine U according to the ninth illustrative embodiment has a correction execution unit C33, instead of the correction execution unit C8 of the first and fifth illustrative embodiments. The correction execution unit C33 of the ninth illustrative embodiment is configured to execute the operation of correcting the skew of the document Gi, like the correction execution unit C8 of the first and fifth illustrative embodiments. The correction execution unit C33 of the ninth illustrative embodiment is different from the correction execution unit C8 of the first and fifth illustrative embodiments, in that when the correction by the pre-register rolls 14 is executed, the correction by the image rotation processing unit C10 is executed. Also, the correction execution unit C33 of the ninth illustrative embodiment is different from the correction execution unit C8 of the first and fifth illustrative embodiments, in that when the correction by the image rotation processing unit C10 is executed, the correction by the pre-register rolls 14 is executed. The other processing is the same as the fifth illustrative embodiment.

Figure 21:
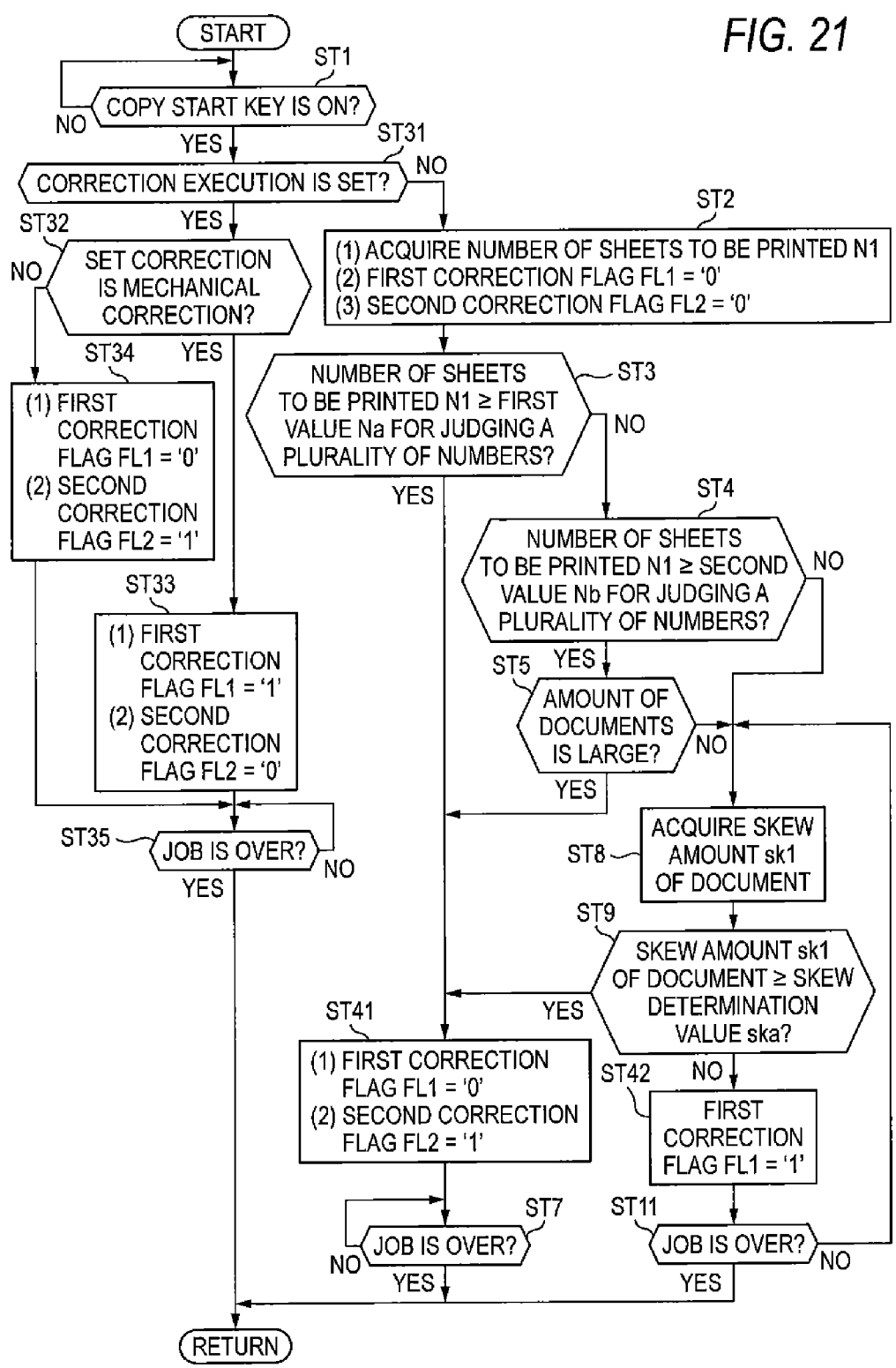
FIG. 21 is a flowchart showing skew correction processing according to the ninth illustrative embodiment, which corresponds to FIG. 13 of the fifth illustrative embodiment.

FIG. 21 is a flowchart showing the skew correction processing according to the ninth illustrative embodiment, which corresponds to FIG. 13 of the fifth illustrative embodiment.

In FIG. 21, the skew correction processing of the ninth illustrative embodiment is different from the skew correction processing of the fifth illustrative embodiment, in that the control unit C executes steps ST41, ST42, instead of steps ST6, ST10 of the fifth illustrative embodiment. The other processing is the same. Therefore, the descriptions of the other steps ST are omitted so as to simplify the descriptions.

In step S41, the control unit C executes processing (1) of setting the first correction flag FL1 to '0' and processing (2) of setting the second correction flag FL2 to '1' and then proceeds to step ST7.

In step S42, the control unit C sets the first correction flag FL1 to '1' and then proceeds to step ST11.

Operations of Ninth Illustrative Embodiment

In the copying machine U of the ninth illustrative embodiment having the above-described configuration, when the number of sheets to be printed N1 is larger than the first value Na for judging a plurality of numbers, when the number of sheets to be printed N1 is larger than the second value Nb for judging a plurality of numbers and the amount of documents Gi is large, and when the skew amount sk1 of the document is large, the software correction by the image rotation processing unit C10 is executed. When the number of sheets to be printed N1 or the amount of documents Gi is small, and when the skew amount sk1 is small, the mechanical correction by the pre-register rolls 14 is executed.

Here, in the mechanical skew correction using the pre-register rolls 14, a correctable skew amount is changed depending on a bending magnitude resulting from the collision of the front end of the document Gi. Also, the correctable skew amount is changed by an alignment (a positional relation, a parallelism) between the pre-register rolls 14 with which the document Gi collides and the reading members CCD, 21.

Also, in the software skew correction, when calculating the skew, a necessary storage capacity and a correctable skew amount are changed depending on an image range that is set as a calculation target. Also, the correctable skew amount can be made to be approximately zero if much time is consumed for the software processing. However, the correctable skew amount is actually changed by the processing speed of the CPU or required precision of the skew correction.

Therefore, the correctable skew amount may be larger in the software skew correction than in the mechanical skew correction, depending on the mechanical configurations or various settings. In this case, unlike the first to eighth illustrative embodiments, if the software correction is executed when the skew amount sk1 is large and the like and the mechanical skew correction is executed when the skew amount sk1 is small and the like, like the ninth illustrative embodiment, it is possible to execute the appropriate skew correction, depending on the situations.

Particularly, in the ninth illustrative embodiment, when the skew amount sk1 is small, and the like, the mechanical correction is executed, so that the reading operation is performed at high speed.

Modified Embodiments

Although the illustrative embodiments of the present invention have been described in detail, the present invention is not limited to the illustrative embodiments and a variety of changed cam be made within the scope defined in the claims. Modified embodiments (H01) to (H10) of the present invention are described below.

(H01) In the above illustrative embodiments, the configuration of the copying machine U has been exemplified as the image forming apparatus. However, the present invention is not limited thereto and can be also applied to a complex machine having a plurality of functions such as a copier, a printer, a FAX and the like.

(H02) In the above illustrative embodiments, the configuration of the copying machine U having the document conveyance device U1a has been exemplified. However, the present invention can be also applied to a configuration where the image preparation unit U3 having the image recording unit U3a, the feeder unit U2 and the medium processing device U4 are omitted from the copying machine U. That is, a configuration of the scanner unit U1 single body, i.e., a configuration of only a scanner is also possible.

(H03) In the above illustrative embodiments, the exemplified specific numerical values can be arbitrarily changed depending on the designs, the change in the specification, and the like.

(H04) In the above illustrative embodiments, when the document Gi passes through the document conveyance path GH, both surfaces of the document Gi are read. However, the present invention is not limited thereto. For example, after a first surface is read by the CCD, the document Gi is switched back to reverse its front surface and back surface at the document discharge tray U1a3, so that a second surface thereof can be also read by the CCD.

(H05) In the above illustrative embodiments, it is determined whether or not to execute the correction, based on the amount of documents, the number of sheets to be printed and the skew amount. However, the present invention is not limited thereto. For example, the user may manually set 'execution of the correction', 'no execution of the correction' and 'automatic correction' through the operation unit UI, and when the 'automatic correction' is set by the user, the processing of the illustrative embodiments may be executed.

(H06) In the above illustrative embodiments, the flags FL1, FL2 are initialized in steps ST2, ST21. However, the present invention is not limited thereto. For example, a next reading operation may start at a state where the final correction is set upon the previous reading operation, without initializing the flags FL1, FL2.

(H07) In the above illustrative embodiments, the skew amount sk1 is measured every first sheet. However, the present invention is not limited thereto. For example, the measurement of the skew amount may be arbitrarily changed depending on the designs, the specification and the like. For instance, the skew amount may be measured every five sheets. In the meantime, the first sheet upon the start of the reading is preferably subject to the measurement of the skew amount sk1.

(H08) In the above illustrative embodiments, it is preferable to set the skew correction on the basis of the skew amount sk1. However, the entire processing thereof may be omitted.

(H09) In the above illustrative embodiments, the number of sheets to be printed and (the number of sheets to be printed× the number of documents) have been exemplified as the number of copies of the document. However, the present invention is not limited thereto. That is, it is possible to adopt any parameter relating to the number of copies of the document. For example, when the number of documents is known in advance, the number of documents may be used.

(H10) In the above illustrative embodiments, the first to ninth illustrative embodiments can be combined with each other. For example, the eighth illustrative embodiment can be applied to the first to fourth, sixth, seventh and ninth illustrative embodiments.

What is claimed is:

1. An image forming apparatus comprising:
    a loading unit capable of loading therein a plurality of documents;
    a document conveyance path to which the document is conveyed from the loading unit;
    a reading member configured to read an image of the document at a reading position set on the document conveyance path;
    a correction unit that corrects a skew of the document with respect to a conveying direction; and
    a correction execution unit that executes a correction by the correction unit when a number of copies of the document is larger than a preset number.

2. The image forming apparatus according to claim 1, further comprising
    a document detection member configured to detect an amount of the documents,
    wherein the correction execution unit executes the correction by the correction unit when the number of copies of the document is equal to or smaller than the preset number and is larger than a second preset number smaller than the preset number and an amount of the documents is larger than a preset amount of documents.

3. The image forming apparatus according to claim 1, wherein
    the correction unit is arranged on the document conveyance path and is contacted to an end of the document to correct the skew of the document.

4. The image forming apparatus according to claim 1, wherein
    the correction unit is configured to correct the skew of the document on the basis of the image read by the reading member.

5. The image forming apparatus according to claim 1,
    wherein the correction unit is arranged on the document conveyance path and is contacted to an end of the document to correct the skew of the document,
    wherein the image forming apparatus further comprises a second correction unit that corrects the skew of the document on the basis of the image read by the reading member, and
    wherein the correction execution unit executes the correction by the correction unit when the number of copies of the document is larger than the preset number, even though a setting of not executing the correction by the correction unit and executing the second correction unit is made.

6. The image forming apparatus according to claim 5, wherein
    when the correction by the correction unit is executed by the correction execution unit, the correction by the second correction unit is not executed.

7. The image forming apparatus according to claim 1,
    wherein the correction unit is arranged on the document conveyance path and is contacted to an end of the document to correct the skew of the document,
    wherein the image forming apparatus further comprises a second correction unit that corrects the skew of the document on the basis of the image read by the reading member, and
    wherein the correction execution unit executes a correction by the second correction unit when the number of copies of the document is larger than the preset number, even though a setting of executing the correction by the correction unit and not executing the correction by the second correction unit is made.

8. The image forming apparatus according to claim 7, wherein
    when the correction by the second correction unit is executed by the correction execution unit, the correction by the correction unit is not executed.

9. An image forming apparatus comprising:
    a loading unit capable of loading therein a plurality of documents;
    a document conveyance path to which the document is conveyed from the loading unit;
    a reading member configured to read an image of the document at a reading position set on the document conveyance path;
    a correction unit that corrects a skew of the document with respect to a conveying direction; and
    a correction execution unit that executes a correction by the correction unit when a number of copies of the document is large and not executes the correction when the number of copies of the document is small.

10. An image forming apparatus comprising:
a loading unit capable of loading therein a plurality of documents;
a document conveyance path to which the document is conveyed from the loading unit;
a reading member configured to read an image of the document at a reading position set on the document conveyance path;
a correction unit that corrects a skew of the document with respect to a conveying direction; and
a correction execution unit that executes a correction by the correction unit when a number of copies of the document is large, depending on the number of copies of the document, from a state where the correction by the correction unit is not executed.

11. An image reading device comprising:
a loading unit capable of loading therein a plurality of documents;
a document conveyance path to which the document is conveyed from the loading unit;
a reading member configured to read an image of the document at a reading position set on the document conveyance path;
a detection unit that detects a skew amount of the document with respect to a conveying direction;
a correction unit that corrects and cancelling the skew of the document;
a setting unit that sets whether or not to execute a correction by the correction unit; and
a correction execution unit that changes the setting of the setting unit and executes the correction by the correction unit for a following document when the skew amount detected by the detection unit is larger than a preset skew amount.

12. The image reading device according to claim 11, wherein
the correction is executed on the basis of the skew amount of the document up to a predetermined number of sheets.

13. The image reading device according to claim 12, wherein
the predetermine number of sheets is one.

14. The image reading device according to claim 11, wherein
the correction unit is arranged on the document conveyance path and is contacted to an end of the document to correct the skew of the document.

15. The image reading device according to claim 11, wherein
the correction unit is configured to correct the skew of the document on the basis of the image read by the reading member.

16. The image reading device according to claim 11,
wherein the correction unit is arranged on the document conveyance path and is contacted to an end of the document to correct the skew of the document,
wherein the image reading device further comprises a second correction unit that corrects the skew of the document on the basis of the image read by the reading member, and
wherein the correction execution unit executes the correction by the correction unit when the skew amount detected by the detection unit is larger than the preset skew amount, even though a setting of not executing the correction by the correction unit and executing the correction by the second correction unit is made.

17. The image reading device according to claim 16, wherein
when the correction by the correction unit is executed by the correction execution unit, the correction by the second correction unit is not executed.

18. The image reading device according to claim 11,
wherein the correction unit is arranged on the document conveyance path and is contacted to an end of the document to correct the skew of the document,
wherein the image reading device further comprises a second correction unit that corrects the skew of the document on the basis of the image read by the reading member, and
wherein the correction execution unit executes the correction by the second correction unit when the skew amount detected by the detection unit is larger than the preset skew amount, even though a setting of executing the correction by the correction unit and not executing the correction by the second correction unit is made.

19. The image reading device according to claim 18, wherein
when the correction by the second correction unit is executed by the correction execution unit, the correction by the correction unit is not executed.

20. The image reading device according to claim 11, wherein
the setting unit can set whether or not to execute the correction by the correction execution unit.

21. The image reading device according to claim 11, wherein
the skew amount of the document at the reading position is detected by the detection unit, and
the correction unit is disposed on an upstream side of the reading position in the conveying direction.

* * * * *